(12) United States Patent
Im et al.

(10) Patent No.: US 10,116,796 B2
(45) Date of Patent: Oct. 30, 2018

(54) REAL-TIME COMMUNICATIONS-BASED INTERNET ADVERTISING

(71) Applicant: Ooma, Inc., Palo Alto, CA (US)

(72) Inventors: James Im, Monroe Township, NJ (US); William M. Gillon, San Mateo, CA (US); Douglas E. Hart, San Jose, CA (US); David A. Bryan, Cedar Park, TX (US); Tobin E. Farrand, Burlingame, CA (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 14/879,329

(22) Filed: Oct. 9, 2015

(65) Prior Publication Data
US 2017/0104875 A1    Apr. 13, 2017

(51) Int. Cl.
*H04M 3/51*    (2006.01)
*H04M 3/487*    (2006.01)
(Continued)

(52) U.S. Cl.
CPC ...... *H04M 3/5191* (2013.01); *H04L 65/1069* (2013.01); *H04M 3/42221* (2013.01); *H04M 3/4365* (2013.01); *H04M 3/4878* (2013.01)

(58) Field of Classification Search
CPC ............... H04M 3/4878; H04M 7/003; H04M 2203/2011; H04M 3/42221; H04M 3/4365; H04M 3/5191; H04L 65/1069
See application file for complete search history.

(56) References Cited

U.S. PATENT DOCUMENTS

| 5,425,085 A | 6/1995 | Weinberger et al. |
| 5,463,595 A | 10/1995 | Rodhall et al. |

(Continued)

FOREIGN PATENT DOCUMENTS

| EP | 3050287 A1 | 8/2016 |
| EP | 3146516 | 3/2017 |

(Continued)

OTHER PUBLICATIONS

Non-Final Office Action, dated Aug. 26, 2008, U.S. Appl. No. 10/888,603, filed Jul. 9, 2004.

(Continued)

*Primary Examiner* — Lisa Hashem
(74) *Attorney, Agent, or Firm* — Carr & Ferrell LLP

(57) ABSTRACT

Provided are methods, systems, and media for Internet Advertising. Exemplary methods may include: providing an advertisement including a first identifier to a website using at least one of a template and an application programming interface (API), the advertisement to be displayed on the website; receiving a communications session initiated by an end customer using the first identifier, the communications session including a second identifier associated with the end customer; accepting the communications session when the second identifier is not included in a black list; retrieving a record associated with the end customer using the second identifier; determining to provide a promotional message to the end customer using the record; selecting an offer using the record; providing the promotional message to the end customer using the communications session, the promotional message including the offer and a request for an indication of interest.

22 Claims, 14 Drawing Sheets

(51) Int. Cl.
  *H04M 3/42*    (2006.01)
  *H04M 3/436*   (2006.01)
  *H04L 29/06*   (2006.01)

(56) References Cited

U.S. PATENT DOCUMENTS

| | | | |
|---|---|---|---|
| 5,519,769 | A | 5/1996 | Weinberger et al. |
| 5,796,736 | A | 8/1998 | Suzuki |
| 5,991,301 | A | 11/1999 | Christie |
| 5,999,611 | A | 12/1999 | Tatchell et al. |
| 6,023,724 | A | 2/2000 | Bhatia et al. |
| 6,104,711 | A | 8/2000 | Voit |
| 6,282,574 | B1 | 8/2001 | Voit |
| 6,298,064 | B1 | 10/2001 | Christie |
| 6,304,572 | B1 | 10/2001 | Christie |
| 6,377,938 | B1 | 4/2002 | Block et al. |
| 6,452,932 | B1 | 9/2002 | Christie |
| 6,463,052 | B1 | 10/2002 | Christie |
| 6,473,429 | B1 | 10/2002 | Christie |
| 6,487,197 | B1 | 11/2002 | Elliott |
| 6,577,638 | B1 | 6/2003 | Tashiro et al. |
| 6,615,264 | B1 | 9/2003 | Stoltz et al. |
| 6,633,561 | B2 | 10/2003 | Christie |
| 6,661,340 | B1 | 12/2003 | Saylor et al. |
| 6,665,429 | B1 | 12/2003 | Christie |
| 6,697,358 | B2 | 2/2004 | Bernstein |
| 6,714,545 | B1 | 3/2004 | Hugenberg et al. |
| 6,775,267 | B1 | 8/2004 | Kung et al. |
| 6,778,517 | B1 | 8/2004 | Lou et al. |
| 6,778,528 | B1 | 8/2004 | Blair et al. |
| 6,781,983 | B1 | 8/2004 | Armistead |
| 6,914,900 | B1 | 7/2005 | Komatsu et al. |
| 6,934,258 | B1 | 8/2005 | Smith et al. |
| 7,113,090 | B1 | 9/2006 | Saylor et al. |
| 7,124,506 | B2 | 10/2006 | Yamanashi et al. |
| 7,127,043 | B2 | 10/2006 | Morris |
| 7,127,506 | B1 | 10/2006 | Schmidt et al. |
| 7,154,891 | B1 | 12/2006 | Callon |
| 7,257,106 | B2 | 8/2007 | Chen et al. |
| 7,280,495 | B1 | 10/2007 | Zweig et al. |
| 7,295,660 | B1 | 11/2007 | Higginbotham et al. |
| 7,342,925 | B2 | 3/2008 | Cherchali et al. |
| 7,376,124 | B2 | 5/2008 | Lee et al. |
| 7,394,803 | B1 | 7/2008 | Petit-Huguenin et al. |
| 7,733,850 | B1 | 6/2010 | Croak et al. |
| 8,140,392 | B2 * | 3/2012 | Altberg .................. G06Q 30/02 379/112.01 |
| 8,331,547 | B2 | 12/2012 | Smith et al. |
| 8,350,694 | B1 | 1/2013 | Trundle et al. |
| 8,515,021 | B2 | 8/2013 | Farrand et al. |
| 8,634,520 | B1 * | 1/2014 | Morrison .............. H04M 3/436 370/241 |
| 8,804,697 | B1 | 8/2014 | Capper et al. |
| 8,837,698 | B2 * | 9/2014 | Altberg .................. G06Q 30/02 379/114.13 |
| 9,225,626 | B2 | 12/2015 | Capper et al. |
| 9,319,531 | B1 | 4/2016 | Capper et al. |
| 9,386,148 | B2 | 7/2016 | Farrand et al. |
| 9,386,414 | B1 | 7/2016 | Mayor et al. |
| 9,560,198 | B2 | 1/2017 | Farrand et al. |
| 9,633,547 | B2 | 4/2017 | Farrand et al. |
| 9,667,782 | B2 | 5/2017 | Farrand et al. |
| 9,787,611 | B2 | 10/2017 | Gillon et al. |
| 9,905,103 | B2 | 2/2018 | Hsieh |
| 9,929,981 | B2 | 3/2018 | Gillon et al. |
| 10,009,286 | B2 | 6/2018 | Gillon et al. |
| 2001/0053194 | A1 | 12/2001 | Johnson |
| 2002/0016718 | A1 | 2/2002 | Rothschild et al. |
| 2002/0035556 | A1 | 3/2002 | Shah et al. |
| 2002/0037750 | A1 | 3/2002 | Hussain et al. |
| 2002/0038167 | A1 | 3/2002 | Chimomas |
| 2002/0085692 | A1 | 7/2002 | Katz |
| 2002/0130784 | A1 | 9/2002 | Suzuki et al. |
| 2002/0133614 | A1 | 9/2002 | Weerahandi et al. |
| 2002/0140549 | A1 | 10/2002 | Tseng |
| 2002/0165966 | A1 | 11/2002 | Widegren et al. |
| 2003/0027602 | A1 | 2/2003 | Han et al. |
| 2003/0058844 | A1 | 3/2003 | Sojka et al. |
| 2003/0099334 | A1 | 5/2003 | Contractor |
| 2003/0119492 | A1 | 6/2003 | Timmins et al. |
| 2003/0141093 | A1 | 7/2003 | Tirosh et al. |
| 2003/0164877 | A1 | 9/2003 | Murai |
| 2003/0184436 | A1 | 10/2003 | Seales et al. |
| 2003/0189928 | A1 | 10/2003 | Xiong |
| 2004/0001512 | A1 | 1/2004 | Challener et al. |
| 2004/0010472 | A1 | 1/2004 | Hilby et al. |
| 2004/0010569 | A1 | 1/2004 | Keith et al. |
| 2004/0017803 | A1 | 1/2004 | Lim et al. |
| 2004/0059821 | A1 | 3/2004 | Tang et al. |
| 2004/0086093 | A1 | 5/2004 | Schranz |
| 2004/0090968 | A1 | 5/2004 | Kimber et al. |
| 2004/0105444 | A1 | 6/2004 | Korotin et al. |
| 2004/0160956 | A1 | 8/2004 | Hardy et al. |
| 2004/0235509 | A1 | 11/2004 | Burritt et al. |
| 2005/0027887 | A1 | 2/2005 | Zimler et al. |
| 2005/0036590 | A1 | 2/2005 | Pearson et al. |
| 2005/0074114 | A1 | 4/2005 | Fotta et al. |
| 2005/0078681 | A1 | 4/2005 | Sanuki et al. |
| 2005/0089018 | A1 | 4/2005 | Schessel |
| 2005/0097222 | A1 | 5/2005 | Jiang et al. |
| 2005/0105708 | A1 | 5/2005 | Kouchri et al. |
| 2005/0141485 | A1 | 6/2005 | Miyajima et al. |
| 2005/0152339 | A1 | 7/2005 | Scott et al. |
| 2005/0169247 | A1 | 8/2005 | Chen |
| 2005/0180549 | A1 * | 8/2005 | Chiu .................. H04M 3/4878 379/88.16 |
| 2005/0222820 | A1 | 10/2005 | Chung |
| 2005/0238034 | A1 | 10/2005 | Gillespie et al. |
| 2005/0246174 | A1 * | 11/2005 | DeGolia ........... H04L 29/06027 704/270 |
| 2005/0259637 | A1 | 11/2005 | Chu et al. |
| 2006/0007915 | A1 | 1/2006 | Frame |
| 2006/0009240 | A1 | 1/2006 | Katz |
| 2006/0013195 | A1 | 1/2006 | Son et al. |
| 2006/0059238 | A1 * | 3/2006 | Slater .................. G06Q 10/107 709/206 |
| 2006/0071775 | A1 | 4/2006 | Otto et al. |
| 2006/0092011 | A1 | 5/2006 | Simon et al. |
| 2006/0114894 | A1 | 6/2006 | Cherchali et al. |
| 2006/0140352 | A1 | 6/2006 | Morris |
| 2006/0156251 | A1 | 7/2006 | Suhail et al. |
| 2006/0167746 | A1 | 7/2006 | Zucker |
| 2006/0187898 | A1 | 8/2006 | Chou et al. |
| 2006/0187900 | A1 | 8/2006 | Akbar |
| 2006/0243797 | A1 | 11/2006 | Apte et al. |
| 2006/0251048 | A1 | 11/2006 | Yoshino et al. |
| 2006/0258341 | A1 | 11/2006 | Miller et al. |
| 2006/0259767 | A1 | 11/2006 | Mansz et al. |
| 2006/0268828 | A1 | 11/2006 | Yarlagadda |
| 2006/0268848 | A1 | 11/2006 | Larsson et al. |
| 2007/0030161 | A1 | 2/2007 | Yang |
| 2007/0036314 | A1 | 2/2007 | Kloberdans et al. |
| 2007/0037560 | A1 | 2/2007 | Yun et al. |
| 2007/0037605 | A1 | 2/2007 | Logan |
| 2007/0041517 | A1 | 2/2007 | Clarke et al. |
| 2007/0049342 | A1 | 3/2007 | Mayer et al. |
| 2007/0054645 | A1 | 3/2007 | Pan |
| 2007/0061735 | A1 | 3/2007 | Hoffberg et al. |
| 2007/0067219 | A1 * | 3/2007 | Altberg .................. G06Q 30/00 705/14.71 |
| 2007/0071212 | A1 | 3/2007 | Quittek et al. |
| 2007/0118750 | A1 | 5/2007 | Owen et al. |
| 2007/0121593 | A1 | 5/2007 | Vance et al. |
| 2007/0121596 | A1 | 5/2007 | Kurapati et al. |
| 2007/0132844 | A1 | 6/2007 | Katz |
| 2007/0133757 | A1 | 6/2007 | Girouard et al. |
| 2007/0153776 | A1 | 7/2007 | Joseph et al. |
| 2007/0165811 | A1 | 7/2007 | Reumann et al. |
| 2007/0183407 | A1 | 8/2007 | Bennett et al. |
| 2007/0203999 | A1 | 8/2007 | Townsley et al. |
| 2007/0223455 | A1 | 9/2007 | Chang et al. |
| 2007/0238472 | A1 | 10/2007 | Wanless |
| 2007/0255702 | A1 * | 11/2007 | Orme .................. G06F 17/30696 |
| 2007/0283430 | A1 | 12/2007 | Lai et al. |

(56) References Cited

U.S. PATENT DOCUMENTS

| | | |
|---|---|---|
| 2007/0298772 A1 | 12/2007 | Owens et al. |
| 2008/0049748 A1 | 2/2008 | Bugenhagen et al. |
| 2008/0062997 A1 | 3/2008 | Nix |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Purnadi et al. |
| 2008/0225749 A1 | 9/2008 | Peng et al. |
| 2008/0247382 A1 | 10/2008 | Verma et al. |
| 2008/0247401 A1 | 10/2008 | Bhal et al. |
| 2008/0270457 A1 | 10/2008 | Zilbershtein et al. |
| 2008/0298348 A1 | 12/2008 | Frame et al. |
| 2008/0313297 A1 | 12/2008 | Heron et al. |
| 2008/0316946 A1 | 12/2008 | Capper et al. |
| 2009/0100178 A1 | 4/2009 | Gonzales et al. |
| 2009/0106318 A1 | 4/2009 | Mantripragada et al. |
| 2009/0135008 A1 | 5/2009 | Kirchmeier et al. |
| 2009/0168755 A1 | 7/2009 | Peng et al. |
| 2009/0213999 A1 | 8/2009 | Farrand et al. |
| 2009/0224931 A1 | 9/2009 | Dietz et al. |
| 2009/0240586 A1* | 9/2009 | Ramer ............ G06F 17/30905 705/14.64 |
| 2009/0253428 A1 | 10/2009 | Bhatia et al. |
| 2009/0264093 A1 | 10/2009 | Rothschild |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0034121 A1* | 2/2010 | Bozionek ............ H04L 12/585 370/259 |
| 2010/0046530 A1 | 2/2010 | Hautakorpi et al. |
| 2010/0046731 A1 | 2/2010 | Gisby et al. |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0136982 A1 | 6/2010 | Zabawskyj et al. |
| 2010/0158223 A1* | 6/2010 | Fang ................ G06Q 30/02 379/93.25 |
| 2010/0191829 A1 | 7/2010 | Cagenius |
| 2010/0229452 A1 | 9/2010 | Suk |
| 2010/0277307 A1 | 11/2010 | Horton et al. |
| 2010/0278173 A1 | 11/2010 | Dalton et al. |
| 2010/0302025 A1 | 12/2010 | Script |
| 2011/0047031 A1* | 2/2011 | Weerasinghe ......... G06Q 30/02 705/14.66 |
| 2011/0054689 A1 | 3/2011 | Nielsen et al. |
| 2011/0111728 A1 | 5/2011 | Ferguson et al. |
| 2011/0140868 A1 | 6/2011 | Hovang |
| 2011/0170680 A1 | 7/2011 | Chislett et al. |
| 2011/0183652 A1 | 7/2011 | Eng et al. |
| 2011/0265145 A1 | 10/2011 | Prasad et al. |
| 2012/0010955 A1* | 1/2012 | Ramer ................ G06Q 30/02 705/14.46 |
| 2012/0027191 A1 | 2/2012 | Baril et al. |
| 2012/0035993 A1* | 2/2012 | Nangia ................ G06Q 30/02 705/14.4 |
| 2012/0036576 A1 | 2/2012 | Iyer |
| 2012/0047442 A1 | 2/2012 | Nicolaou et al. |
| 2012/0092158 A1 | 4/2012 | Kumbhar et al. |
| 2012/0099716 A1 | 4/2012 | Rae et al. |
| 2012/0284778 A1 | 11/2012 | Chiou et al. |
| 2012/0320905 A1* | 12/2012 | Ilagan ................ H04L 65/1069 370/352 |
| 2012/0329420 A1 | 12/2012 | Zotti et al. |
| 2013/0018509 A1 | 1/2013 | Korus |
| 2013/0035774 A1 | 2/2013 | Warren et al. |
| 2013/0053005 A1* | 2/2013 | Ramer .................. H04W 4/025 455/414.1 |
| 2013/0070928 A1 | 3/2013 | Ellis et al. |
| 2013/0154822 A1 | 6/2013 | Kumar et al. |
| 2013/0214925 A1 | 8/2013 | Weiss |
| 2013/0267791 A1 | 10/2013 | Halperin et al. |
| 2013/0272219 A1 | 10/2013 | Singh et al. |
| 2013/0288639 A1 | 10/2013 | Varsavsky Waisman-Diamond |
| 2013/0293368 A1 | 11/2013 | Ottah et al. |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0120863 A1 | 5/2014 | Ferguson et al. |
| 2014/0169274 A1 | 6/2014 | Kweon et al. |
| 2014/0172953 A1 | 6/2014 | Blanksteen |
| 2014/0222436 A1 | 8/2014 | Binder et al. |
| 2014/0253326 A1 | 9/2014 | Cho et al. |
| 2014/0266699 A1 | 9/2014 | Poder et al. |
| 2014/0273912 A1 | 9/2014 | Peh et al. |
| 2014/0273979 A1 | 9/2014 | Van Os et al. |
| 2014/0306802 A1 | 10/2014 | Hibbs, Jr. |
| 2014/0358666 A1* | 12/2014 | Baghaie ............ G06Q 30/0267 705/14.41 |
| 2015/0065078 A1 | 3/2015 | Mejia et al. |
| 2015/0071450 A1 | 3/2015 | Boyden et al. |
| 2015/0082451 A1* | 3/2015 | Ciancio-Bunch ....... H04L 51/12 726/26 |
| 2015/0086001 A1 | 3/2015 | Farrand et al. |
| 2015/0087280 A1 | 3/2015 | Farrand et al. |
| 2015/0100167 A1 | 4/2015 | Sloo et al. |
| 2015/0117624 A1* | 4/2015 | Rosenshine ....... H04M 3/42042 379/142.04 |
| 2015/0138333 A1 | 5/2015 | DeVaul et al. |
| 2015/0145693 A1 | 5/2015 | Toriumi et al. |
| 2015/0177114 A1 | 6/2015 | Kapoor et al. |
| 2015/0229770 A1 | 8/2015 | Shuman et al. |
| 2015/0244873 A1 | 8/2015 | Boyden et al. |
| 2015/0262435 A1 | 9/2015 | Delong et al. |
| 2015/0281450 A1* | 10/2015 | Shapiro ............... H04M 3/4878 379/265.09 |
| 2015/0302725 A1 | 10/2015 | Sager et al. |
| 2015/0334227 A1 | 11/2015 | Whitten et al. |
| 2015/0339912 A1 | 11/2015 | Farrand et al. |
| 2015/0379562 A1* | 12/2015 | Spievak ............... H04M 3/5158 379/265.09 |
| 2016/0012702 A1 | 1/2016 | Hart et al. |
| 2016/0036751 A1 | 2/2016 | Ban |
| 2016/0078750 A1 | 3/2016 | King et al. |
| 2016/0117684 A1 | 4/2016 | Khor et al. |
| 2016/0142758 A1 | 5/2016 | Karp et al. |
| 2016/0173693 A1* | 6/2016 | Spievak ............ G06Q 30/0202 379/265.09 |
| 2016/0248847 A1 | 8/2016 | Saxena et al. |
| 2016/0277573 A1 | 9/2016 | Farrand et al. |
| 2016/0300260 A1* | 10/2016 | Cigich ............... G06Q 30/0244 |
| 2016/0323446 A1 | 11/2016 | Farrand et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0373372 A1 | 12/2016 | Gillon et al. |
| 2017/0021802 A1 | 1/2017 | Mims |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0270569 A1* | 9/2017 | Altberg ............... G06Q 30/02 |
| 2017/0293301 A1 | 10/2017 | Myslinski |
| 2018/0061213 A1 | 3/2018 | Morehead |

(56) References Cited

U.S. PATENT DOCUMENTS

2018/0075540 A1     3/2018    Bernard et al.
2018/0152557 A1     5/2018    White et al.

FOREIGN PATENT DOCUMENTS

| EP | 3167340 A1 | 5/2017 |
|---|---|---|
| EP | 3295620 | 3/2018 |
| WO | WO2015041738 | 3/2015 |
| WO | WO2015179120 | 11/2015 |
| WO | WO2016007244 | 1/2016 |
| WO | WO2016182796 A1 | 11/2016 |
| WO | WO2018044657 | 3/2018 |

OTHER PUBLICATIONS

Non-Final Office Action, dated May 11, 2009, U.S. Appl. No. 11/717,947, filed Mar. 13, 2007.
Non-Final Office Action, dated Nov. 24, 2009, U.S. Appl. No. 11/717,947, filed Mar. 13, 2007.
Final Office Action, dated Jun. 23, 2010, U.S. Appl. No. 11/717,947, filed Mar. 13, 2007.
Non-Final Office Action, dated Sep. 13, 2010, U.S. Appl. No. 11/717,947, filed Mar. 13, 2007.
Non-Final Office Action, dated Feb. 16, 2011, U.S. Appl. No. 11/717,947, filed Mar. 13, 2007.
Final Office Action, dated May 25, 2011, U.S. Appl. No. 11/717,947, filed Mar. 13, 2007.
Non-Final Office Action, dated Dec. 6, 2011, U.S. Appl. No. 12/214,756, filed Jun. 20, 2008.
Final Office Action, dated May 31, 2012, U.S. Appl. No. 12/214,756, filed Jun. 20, 2008.
Non-Final Office Action, dated Feb. 12, 2014, U.S. Appl. No. 12/214,756, filed Jun. 20, 2008.
Final Office Action, dated Jul. 31, 2014, U.S. Appl. No. 12/214,756, filed Jun. 20, 2008.
Advisory Action, dated Oct. 9, 2014, U.S. Appl. No. 12/214,756, filed Jun. 20, 2008.
Advisory Action, dated Nov. 5, 2014, U.S. Appl. No. 12/214,756, filed Jun. 20, 2008.
Notice of Allowance, dated Sep. 10, 2015, U.S. Appl. No. 12/214,756, filed Jun. 20, 2008.
Non-Final Office Action, dated Dec. 27, 2011, U.S. Appl. No. 12/156,562, filed Jun. 2, 2008.
Final Office Action, dated Apr. 3, 2012, U.S. Appl. No. 12/156,562, filed Jun. 2, 2008.
Non-Final Office Action, dated Jul. 13, 2012, U.S. Appl. No. 12/156,562, filed Jun. 2, 2008.
Final Office Action, dated Jul. 31, 2013, U.S. Appl. No. 12/156,562, filed Jun. 2, 2008.
Non-Final Office Action, dated Mar. 26, 2015, U.S. Appl. No. 12/156,562, filed Jun. 2, 2008.
Final Office Action, dated Jul. 15, 2015, U.S. Appl. No. 12/156,562, filed Jun. 2, 2008.
Non-Final Office Action, dated Jul. 7, 2011, U.S. Appl. No. 12/006,587, filed Jan. 2, 2008.
Final Office Action, dated Jan. 18, 2012, U.S. Appl. No. 12/006,587, filed Jan. 2, 2008.
Advisory Action, dated Feb. 14, 2012, U.S. Appl. No. 12/006,587, filed Jan. 2, 2008.
Non-Final Office Action, dated Sep. 10, 2013, U.S. Appl. No. 12/006,587, filed Jan. 2, 2008.
Final Office Action, dated Jan. 31, 2014, U.S. Appl. No. 12/006,587, filed Jan. 2, 2008.
Advisory Action, dated Mar. 24, 2014, U.S. Appl. No. 12/006,587, filed Jan. 2, 2008.
Non-Final Office Action, dated Sep. 16, 2014, U.S. Appl. No. 12/006,587, filed Jan. 2, 2008.
Final Office Action, dated Jan. 23, 2015, U.S. Appl. No. 12/006,587, filed Jan. 2, 2008.
Advisory Action, dated Apr. 8, 2015, U.S. Appl. No. 12/006,587, filed Jan. 2, 2008.
Non-Final Office Action, dated Nov. 5, 2012, U.S. Appl. No. 12/072,381, filed Jun. 20, 2008.
Final Office Action, dated Apr. 5, 2013, U.S. Appl. No. 12/072,381, filed Feb. 25, 2008.
Non-Final Office Action, dated Sep. 29, 2011, U.S. Appl. No. 12/072,381, filed Feb. 25, 2008.
Final Office Action, dated Feb. 10, 2012, U.S. Appl. No. 12/072,381, filed Feb. 25, 2008.
Advisory Action, dated Apr. 16, 2012, U.S. Appl. No. 12/072,381, filed Feb. 25, 2008.
Advisory Action, dated May 16, 2013, U.S. Appl. No. 12/072,381, filed Feb. 25, 2008.
Notice of Allowance, dated Jun. 13, 2013, U.S. Appl. No. 12/072,381, filed Feb. 25, 2008.
Non-Final Office Action, dated Dec. 30, 2013, U.S. Appl. No. 14/034,457, filed Sep. 23, 2013.
Final Office Action, dated Jul. 1, 2014, U.S. Appl. No. 14/034,457, filed Sep. 23, 2013.
Advisory Action, dated Sep. 18, 2014, U.S. Appl. No. 14/034,457, filed Sep. 23, 2013.
Non-Final Office Action, dated Jan. 29, 2015, U.S. Appl. No. 14/034,457, filed Sep. 23, 2013.
Non-Final Office Action, dated Aug. 24, 2015, U.S. Appl. No. 14/034,457, filed Sep. 23, 2013.
Non-Final Office Action, dated Jan. 7, 2015, U.S. Appl. No. 14/318,630, filed Jun. 28, 2014.
Non-Final Office Action, dated Jul. 21, 2015, U.S. Appl. No. 14/318,630, filed Jun. 28, 2014.
Non-Final Office Action, dated Nov. 12, 2015, U.S. Appl. No. 14/283,132, filed May 20, 2014.
Non-Final Office Action, dated Nov. 13, 2015, U.S. Appl. No. 14/318,630, filed Jun. 28, 2014.
Non-Final Office Action, dated Dec. 31, 2015, U.S. Appl. No. 14/327,163, filed Jul. 9, 2014.
Non-Final Office Action, dated Feb. 2, 2016, U.S. Appl. No. 14/708,132, filed May 8, 2015.
International Search Report and Written Opinion dated Jun. 30, 2016 for App. No. PCT/US2016/030597, filed May 3, 2016.
European Patent Application No. 14845956.3, "Extended European Search Report," dated Feb. 16, 2017, 8 pages.
"Office Action," Canadian Patent Application No. 2949211, dated Aug. 16, 2017, 4 pages.
"Office Action," Canadian Patent Application No. 2954351, dated Oct. 27, 2017, 3 pages.
International Search Report and "Written Opinion of the International Searching Authority," Patent Cooperation Treaty Application No. PCT/US2017/048284, dated Nov. 8, 2017, 8 pages.
"Extended European Search Report," European Patent Application No. 15796148.3, dated Jan. 8, 2018, 8 pages.
International Search Report and Written Opinion dated Nov. 7, 2014 for App. No. PCT/US2014/044945, filed Jun. 30, 2014.
International Search Report and Written Opinion dated Jul. 27, 2015 for App. No. PCT/US2015/029109, filed May 4, 2015.
International Search Report and Written Opinion dated Nov. 2, 2015 for App. No. PCT/US2015/034054, filed Jun. 3, 2015.
"Life Alert's Four Layers of Protection, First Layer of Protection: Protection at Home." Life Alert. https://web.archive.org/web/20121127094247/http://www.lifealert.net/products/homeprotection.html. [retrieved Oct. 13, 2015].
Non-Final Office Action, dated Aug. 9, 2016, U.S. Appl. No. 14/327,163, filed Jul. 9, 2014.
Non-Final Office Action, dated Mar. 23, 2017, U.S. Appl. No. 15/208,004, filed Jul. 12, 2016.
Non-Final Office Action, dated Apr. 18, 2017, U.S. Appl. No. 15/292,051, filed Oct. 12, 2016.
Non-Final Office Action, dated Apr. 18, 2017, U.S. Appl. No. 15/369,655, filed Dec. 5, 2016.
"Office Action," European Patent Application No. 14845956.3, dated Apr. 9, 2018, 4 pages.
"Extended European Search Report," European Patent Application No. 15818258.4, dated Feb. 26, 2018, 8 pages.

(56) References Cited

OTHER PUBLICATIONS

Notice of Allowance, dated Mar. 25, 2016, U.S. Appl. No. 14/034,457, filed Sep. 23, 2013.
Non-Final Office Action, dated May 17, 2016, U.S. Appl. No. 12/156,562, filed Jun. 2, 2008.
Notice of Allowance, dated May 31, 2016, U.S. Appl. No. 14/318,630, filed Jun. 28, 2014.
Non-Final Office Action, dated Jun. 9, 2016, U.S. Appl. No. 14/283,132, filed May 20, 2014.
Non-Final Office Action, dated Jul. 14, 2016, U.S. Appl. No. 15/169,615, filed May 31, 2016.
Notice of Allowance, dated Aug. 1, 2016, U.S. Appl. No. 14/708,132, filed May 8, 2015.
Non-Final Office Action, dated Aug. 9, 2016, U.S. Appl. No. 14/327,163, dated Jul. 9, 2014.
"Notice of Allowance," European Patent Application No. 14845956.3, dated Jul. 11, 2018, 7 pages.
Osterlund, Karl et al., "Communications Network Failure Detection and Remediation," U.S. Appl. No. 16/011,479, dated Jun. 18, 2018, Specification, Claims, Abstract, and Drawings, 92 pages.
"Notice of Allowance", Canadian Patent Application No. 2949211, dated Jul. 31, 2018, 1 page.
"Office Action," Canadian Patent Application No. 2954351, dated Aug. 22, 2018, 4 pages.

\* cited by examiner

REAL-TIME COMMUNICATIONS-BASED INTERNET ADVERTISING

FIELD

The present application relates generally to advertising, and more specifically to communications-based advertising.

BACKGROUND

Driving voice traffic to a business (typically thorough a telephone number, but increasingly through web and mobile device traffic) is often a very high priority for the business. Services or mechanisms that enable customers to locate the business, or better yet, provide information directing customers to a particular business when they need a product or service are of great value to that business. Traditionally, this has been achieved through a variety of methods, including listing the number in telephone directories (e.g., "Yellow Pages"); advertising the number in print, roadside, radio, or television advertising; listing the number on the business location, etc. Over time, this has evolved to marketing over the Internet, including banner advertisements, social media campaigns, review site placements, daily deals/coupons, and other Internet advertising While the Internet may have changed many things about advertising and the process of selling to the customer, many businesses, particularly small businesses, still rely on customers reaching them directly via voice as a primary mechanism for interacting and closing sales.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present technology may be directed to Internet advertising. Exemplary methods may include: providing an advertisement including a first identifier to a website of a plurality of websites using at least one of a template and an application programming interface (API) associated with the website, the advertisement to be displayed on the website; receiving a communications session initiated by an end customer using the first identifier, the communications session including a second identifier associated with the end customer; accepting the communications session when the second identifier is not included in a black list, the black list being produced using at least reported spam; retrieving a record associated with the end customer using the second identifier; determining to provide a promotional message to the end customer using the record; selecting an offer using the record; providing the promotional message to the end customer using the communications session, the promotional message including the offer and a request for an indication of interest; directing the communications session to a live agent of a plurality of live agents in response to receiving the indication of interest from the end customer; and storing data associated with communications session.

DETAILED DESCRIPTION

Figure 1:
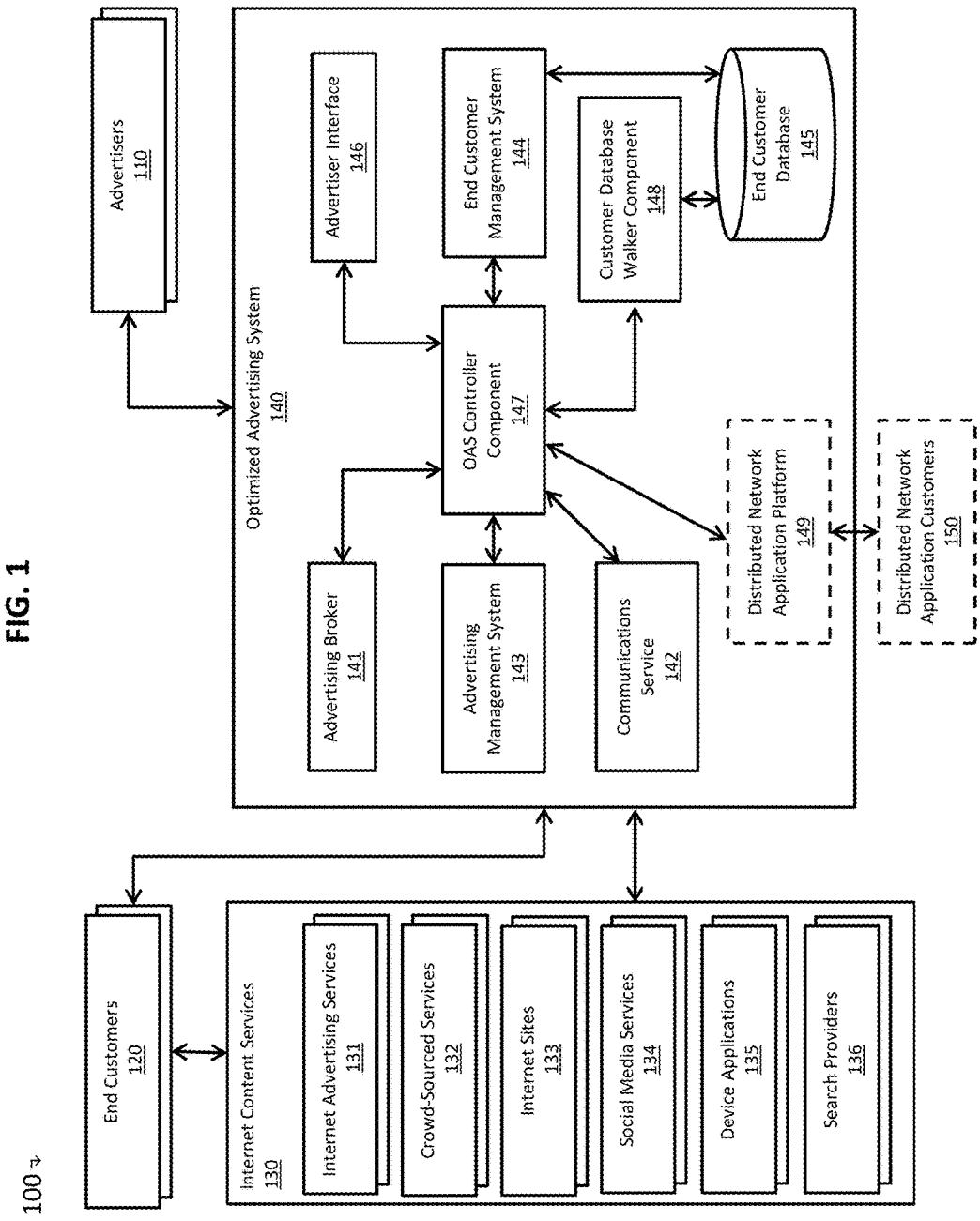
FIG. 1 illustrates a component diagram for an Optimized Advertising System.

While this disclosure is susceptible of embodiment in many different forms, there are shown in the drawings and will herein be described in detail several specific embodiments with the understanding that the present disclosure is to be considered as an exemplification of the principles of the disclosure and is not intended to limit the disclosure to the embodiments illustrated. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Today, a (prospective) customer may use Internet search to locate a business when they need a product or service. A customer may also be referred to in the present disclosure as a "user" or "users." The customer may use different mechanisms to find the information needed to reach the business. For example, a customer may use an Internet search engine or mobile or PC application to search for the generic name of the product or service they need, for example "Pizza delivery." The customer may also search more explicitly for the name of the business, for example "Pizza Express" using a search engine.

In some embodiments, search engines may use geolocation tools to identify the location of the customer performing the search. Location mechanisms (e.g., geolocation tools) may vary depending on the type of device used, service used, and many other factors, and may be explicit or implicitly activated by the customer. For example, a customer performing a search inside a map program of a mobile device (e.g., maps applications) can be explicitly expecting the results to be geo-located. In this case, the mobile device may use explicit positioning data from Global Positioning System satellites (GPS) or location data provided by the service provider, for example triangulating location from cellular phone tower strength, to determine position. The customer may also explicitly specify a location, either in the map application or in a simple web search, for example "Pizza Delivery Denver Colo.," in which case the desired search location is obtained from the customer's search.

In various embodiments, the customer may initiate the search in a way that is less explicit about a desire for location, for example by searching for pizza delivery in the web browser of a mobile device or on a computer. A mobile device also may be unable to determine its location using these explicit mechanisms. In such cases, it is still useful to provide relevant location specific search results, and a number of mechanisms are used to provide this. Systems may identify locations based on the Internet Protocol (IP) address being used by the device. Because most IP addresses used by customers are tied to a service provider (e.g., cable company, DSL provider, etc.), and these are often allocated region-by-region, this can be used to provide broad location information. The physical locations of many Wi-Fi base stations have been mapped by cars driving through neighborhoods and equipped with GPS devices. By identifying nearby Wi-Fi access points, location can also be determined. Other similar mechanisms may be used to provide location information even in cases where explicit location information is not available.

In some embodiments, a customer may identify a provider of a good and/or service using a social networking, such as a crowd-sourced review site (e.g., Yelp.com). For example, social networking users may provide reviews (e.g., a rating and/or written description) of at least one of a provider, good, and service, and (other) users may search for providers using location (e.g., city, neighborhood, street, etc.) and a type of the good and/or service sought.

Businesses may use automated systems designed to answer phone calls, and respond to interaction from customers, either in the form of dial tones (button presses), also called dial-tone multi-frequency (DTMF) signaling; or by responding to spoken commands. These systems are called Interactive Voice Response (IVR) systems. Frequently, IVR systems may be relatively static, for example once an IVR system is configured, companies often leave them "as is" for months or even years at a time. In addition, IVR systems can provide very little information to the business about who called, when, and what actions they took. While this may be acceptable for some businesses, the ability to track customers who are calling, and to offer frequently updated information (including information that has been tailored based on parameters related to the caller) can be desirable to the business.

Additionally, businesses may mount (elaborate and often expensive) advertisement campaigns around special promotions. Promotions may include flyers, mailers, television advertisements, radio advertisements, Internet advertisement placements, and social media campaigns. However, when the customer contacts the business by voice, they are presented with an IVR system that is not coupled to the offer. A consumer who has seen an offer may not be able to determine how to proceed with that offer, and consumers who have called the number without seeing the offer may be unaware of the offer unless an employee mentions it.

FIG. 1 illustrates various components of a system 100 for providing an optimized, real-time communications-based Internet advertising service.

One or more Advertisers 110 promote their respective products and/or services by, for example, describing benefits of the products and/or services. For example, Advertisers 110 place advertisements or otherwise place information related to a Contact Identifier (e.g., a phone number), used to reach the advertiser via a communications session, on the Internet for the purpose of attracting business from one or more End Customers 120. Advertisers 110 may be any party that places an advertisement to reach an End Customer 120. For example, Advertisers 110 include one or more of: an "advertising agency" and/or marketing firm; actual merchants or manufacturers selling a product or providing a service to the End Customers 120; an intermediate party that places advertising and relays those leads to the manufacturer or service in exchange for a commission or similar remuneration (e.g., a more traditional advertising service); a party which generates leads for the manufacturer or service; and a party which resells the products and/or services of others directly. Additionally, an agent may act on behalf of the Advertisers 110. For example, the agent contracts a third party to answer incoming communications sessions or to handle advertising.

In some embodiments, a Contact Identifier can be any way to reach the advertiser using a communications system. For example, the contact identifier is a traditional telephone number, which can be dialed to reach the Advertiser 110. A traditional telephone number can be a sequence of digits assigned to a fixed-line telephone subscriber station connected to a telephone line or to a wireless electronic telephony device, such as a radio telephone or a mobile telephone, or to other devices for data transmission via the public switched telephone network (PSTN) and/or other networks. By way of further non-limiting example, Contact Identifier may be an identifier used by a Voice over IP (VoIP) system, for example a Session Initiation Protocol (SIP) Uniform Resource Locator (URL). SIP is a communications protocol for signaling and controlling multimedia communication sessions. For example, SIP can be used in Internet telephony for voice and video calls, as well as instant messaging (IM) over Internet Protocol (IP) networks.

By way of further non-limiting example, a Contact Identifier may be a web uniform resource locator (URL) or hyperlink that can be used to visit a webpage offering real-time communications capabilities, (e.g., using the Web Real-Time Communication (WebRTC) standard or similar browser communications technology for voice, video, and/or text-based messaging). A URL is one type of Uniform Resource Identifier (URI) (e.g., names and addresses) that refer to objects on the Internet, including the World Wide Web. By way of further non-limiting example, the Contact Identifier may be a handle or user identifier with a communications service (e.g., videotelephony such as Skype, FaceTime, etc.). By way of further non-limiting example, a Contact Identifier may be a numeric identifier used to reach the Advertiser 110 through an application, for example, installed on a mobile device, consumer electronic device, gaming system, wearable device, virtual or augmented reality device, etc.

The advertisements may be any mechanism used to reach End Customers 120 through the Internet with the intent to motivate engagement with Advertisers 110. Advertisements can include the Contact Identifier and convey information about at least one of a product, service, and brand. For example, advertisements use different services and include at least one of email marketing, search engine marketing (SEM), social media marketing, many types of display advertising (including web banner advertising), and mobile advertising. SEM is promotion of websites by increasing their visibility in search engine results pages (SERPs), such as through paid advertising. Display advertising is advertisements located on websites and includes at least one of text, images, flash, video, and audio. Mobile advertising is advertising delivered through mobile (wireless) phones or other mobile (or wearable) devices.

In some embodiments, advertisements are at least one of entries on review sites, associations with map locations, associations with search keywords, postings on social media services, etc. For example, advertisements use one or more services, such as search engine (optimization); social media (marketing); email (marketing); referral programs; content marketing such as news, video, white papers, e-books, infographics, case studies, how-to guides, question and answer articles, and photos; and native advertising. Native advertising is a form of online advertising that matches the form and function of the platform on which it appears (e.g., coherence). For example, an article written by an advertiser to promote their product, but using the same form as an article written by the editorial staff.

Internet Content Services 130 may comprise at least one of: Internet Advertising Services 131, Crowd-Sourced Contact Services 132, direct Internet Sites 133, Social Media Services 134, Device Applications 135, and Search Providers 136.

Internet Advertisement Services 131 may be a service that stores and places advertisements on various sites on the Internet. Advertisements may be in the form of banner advertisements placed on sites, sponsored results displayed during a search, interstitial advertisements, short video advertisements, mobile advertisements, etc. Advertisements may be hosted by the Advertisement Services 131, but may appear in many different places (e.g., websites). Examples of Internet Advertisement Services 131 include search providers through the ad keyword service and related products, and Millennial Media.

Crowd-Sourced Services 132 is an advertising mechanism. In Crowd-Sourced Services 132, many users contribute information, including contact information and reviews, for various services. Crowd-Sourced Services 132 may be correlated with a location and mapping service (e.g., map applications in mobile devices or the web), allowing users to "mark" the location of a business, and to update information such as the services provided, contact number, etc. When a different user performs a search for a nearby business of a certain type or keyword, this information is used to match the user to a business geographically nearby (e.g., within a predefined radius such as 1 mile, 2 miles, 5 miles, 10 miles, 25 miles, and the like). Crowd-Sourced Services 132 may be a referral or review service allowing/enabling users to rate or review business, again listing information about the business including contact information. Examples of this type of service include Yelp, UrbanSpoon, and the reviews portion of map services.

Internet Sites 133 may display advertisements directly on their sites (and additionally may have ads placed through Internet Advertising Service 131). In some embodiments, the sites that are desirable to advertise with have a large installed user base, making them attractive to advertisers seeking to reach that user base directly. Examples of Internet Sites 133 include Facebook and Twitter, and may also include sites generating significant content, for example, television and other media sites (e.g., FoxNews, WSJ, CNN, etc.). Presentation of advertisements on Internet Sites 133 may be refined using (and associated with) geographical locations, keywords, etc.

Social Media Services 134 may be services allowing individuals or organizations to share updates or information about themselves, their thoughts and interests, products, etc. Other users of such services are able to see the information from their friends and from organizations they are interested in, presented as a "feed" of customized information. A feed is a mechanism for users to receive updated data from data sources. For example, a feed is used by real-time applications in point-to-point settings as well as on the World Wide Web. The content of the feed may be determined by which friends, individuals or organizations a user has decided to at least one of "friend," "follow," "subscribe," and the like. Examples of Social Media Services 134 include Facebook and Twitter. In contrast to the Internet Sites 133, advertisements may not be placed on Social Media Services 134, but instead may manifest as postings to social media feeds controlled by Advertisers 110 (or feeds controlled by others). Social Media Services 134, Social Media Services 134 may have a relationship with Advertising Broker 141, allowing information to be posted on user's feeds.

Device Applications 135 may be software applications that are installed on a device used by End Customer 120. Device Applications 135 can include applications on mobile devices, tablets, PCs, smart home devices, security devices, consumer electronics (e.g., smart televisions, gaming systems, automobile entertainment systems, DVD players, eReaders, etc.), wearable devices, virtual reality (VR) or augmented reality devices, and the like. Device Applications 135 may provide opportunities to place advertisements, often with supporting mechanisms to communicate in the application, for example, with notifications to the user, banner advertisements, and even real-time communications capabilities. Device Applications 135 may be iOS and/or Android applications, as well be applications installed on various devices.

Search Providers 136 may be services that search, index, and rank information on the Internet, making it easier for End Customers 120 to access the information they are looking for. These services may sometimes be co-operated with Internet Advertising Services 131, but may also be unrelated. In addition to placing traditional advertisements, Advertising Broker 141's services may include optimizing the ranking of search results related to Advertiser 110 that contain a Contact Identifier to reach Advertiser 110, in order to make the End Customer 120 more likely to locate them. The term generally used for the process of improving a ranking of a page or other content with a Search Provider 136 is Search Engine Optimization (SEO), and this may be performed as part of the role of Advertising Broker 141.

In some embodiments, Optimized Advertising System 140 facilitates a relationship between Advertisers 110, End Customers 120, and Internet Content Services 130. For example, Advertising Broker 141 operates the overall Optimized Advertising System 140 to enable Advertisers 110 to deliver advertisements to End Customers 120 via Internet Content Services 130. Advertising Broker 141 may typically be an organization or company that is responsible for overall operation of the Optimized Advertising System 140. For example, Advertising Broker 141 maintains relationships with the Advertisers 110 and uses the rest of the Optimized Advertising System 140 to ensure that End Customers 120 are able to reach the Advertisers 110 using a Contact Identifier or other interactive communications contact method (e.g., URL for Internet voice or video, unique ID for communications app or services, etc.) published by one or more Internet Content Services 130. Other components of Optimized Advertising System 140 may be owned or operated by separate entities and contracted by Advertising Broker 141, or may all be owned and operated by the Advertising Broker 141.

Communications Service 142 may be a service for the Advertising Broker 141 to set up one or more Contact Identifiers that may ultimately be used by End Customers 120 to reach one or more Advertisers 110. For example, Contact Identifiers are provided to the End Customers 120 by being placed on Internet Content Services 130. As described in more detail below, different Contact Identifiers (e.g., for one Advertiser 110) may be used, which may enable the Advertising Broker 141 to bill for each customer interaction delivered, to track how effective various Internet Content Services 130 options are, and to retain control of the customer relationship.

Communications Service 142 may comprise a number of parts, any or all of which may be used to provide services to Advertisers 110, including: telephony gateways, allowing calls from conventional telephones to reach the service; softswitch functionality, allowing routing of conversations; Interactive Voice Response, or IVR systems, able to handle incoming phone calls without human intervention through the use of touchtone or voice interaction; video communications tools, text based communications tools, and Internet communications tools, including tools allowing instant message and web-based voice or video communications in place of a traditional telephone, as well as tools allowing applications (e.g., Android and/or iOS applications) to send and receive voice, video, text, picture, or other messages.

Advertising Management System 143 may include a system of tools for providing a number of services. As some of the services that comprise Internet Content Services 130 (e.g., Crowd-Sourced Services 132) may not alone provide simple interfaces to allow/enable rapid capture, modification, and/or creation of information, Advertising Management System 143 may allow easy, consolidated access to these services. Advertising Management System 143 may also monitor for changes to these services, for example, including changes that would impact how frequently the advertisements for Advertisers 110 are displayed to users, and correct/update them as needed. Advertising Management System 143 may control a distributed access and updating system to interact with Internet Contact Services 130.

Additionally or alternatively, Advertising Management System 143 may "capture" incoming calls from Internet Content Service (e.g., Crowd-Sourced Services 132) directing these incoming calls to Advertising Broker 141 or their agents. To verify that contacts placed on Internet Content Services, especially Crowd-Sourced Services 132, are accurate (e.g., associated with a claimed physical location), Crowd-Sourced Services 132 may connect and try to verify information (e.g., cross street of the location, color of the building, etc.) about the claimed physical location, using the contact, to ensure the person/entity reached at the contact indeed can verify the information. Advertising Management System 143 provides a Test Enablement Component 1730 (described further below in relation to FIG. 10), which, utilizing information from Campaign Database 1721 (described further below in relation to FIG. 10) and information obtained from the Internet, displays appropriate verification information. This ensures information is available to Advertising Broker 141 or their agents to handle such verifications from Internet Content Services 130.

In this way, Crowd-Sourced Services 132 may verify their/its information. By way of non-limiting example, Advertising Broker 141 using data stored in Campaign Database 1721 and/or information pulled from the Internet (e.g., maps, street photos, satellite images, etc.) may present the information to Crowd-Sourced Services 132 using Test Enablement Component 1720. Advertising Broker 141 or their agent may handle/answer the incoming calls from Crowd-Sourced Services 132 and can answer questions presented by Crowd-Sourced Services 132 and associated with the information.

End Customer Management System 144 and End Customer Database 145 may be used to collect, use, and share information that Optimized Advertising System 140 maintains about incoming communications session users and other End Customers 120. The information may be keyed to allow identification of different End Customers 120 through one or more Customer Communications Identifiers, discussed in more detail below.

Advertisers 110 may interact with the Optimized Advertising System 140 using Advertiser Interface 146. Advertising Interface 146 may: be a software library and/or Application Programming Interface (API), to which the Advertisers 110 or their agent's call center is connected; software or web pages hosted by Advertising Broker 141, and accessed over a network; be software integrated with the Advertisers 110 or their agents' Customer Relationship Management (CRM) software, integrated via Advertiser Interface 146; and make the data available to Advertisers 110 or their agents in some other way.

A central controller for the Optimized Advertising System (OAS) may also be included to facilitate communications between the various components. This is referred to as OAS Controller Component 147.

A Customer Database Walker Component 148 may periodically traverse End Customer Database 145 looking for defined patterns, and taking actions for certain entries tied to End Customers 120. The function of Customer Database Walker Component 148 is described further below.

Optionally, the system may also include a Distributed Network Application Platform 149. Distributed Network Application Platform 149 may be a system of many network enabled devices over which Advertising Broker 141 exerts some level of control. For example, in addition to operating the advertising service, Advertising Broker 141 may also operate a Communications Service 142, and as a part of Communications Service 142, Advertising Broker 141 has extensive functionality and equipment related to communications services. For example, if Communications Service 142 is operated by Advertising Broker 141 and also offers communications services to (potentially many) customers, it may include many VoIP telephony devices distributed among many customers (e.g., located at the premises of and owned by those customers), but under control of the Advertising Broker. Advertising Broker 141 may also operate the Communications Service 142 to deliver consumer communications services to a group of Distributed Network Application Customers 150. For example, Communications Service 142 may provide telephony service, allowing the customers to place/receive calls, video chats, etc.

Each of Distributed Network Application Customers 150 may have a device located in their home or business which performs the service (e.g., a router, telephony adapter, video conference system, telephony or conferencing device, mobile device, communications tablet, networking device, etc.). Collectively, these devices comprise the Distributed Network Application Platform 149, giving Advertising Broker 141 access to a large number of distributed network devices. In addition to delivering services to Distributed Network Application Customers 150, Distributed Network Application Platform 149 may also facilitate distributed operations benefiting Advertising Broker 141 or one or more Advertisers 110, as described further below.

Advertising Broker 141 may control and operate a Distributed Network Platform 149. For example, when the Advertising Broker 141 also manufactures consumer devices and/or provides a service running on such devices (e.g., entertainment, education, security, home automation, etc.), the consumer devices can be included in Distributed Network Platform 149. By way of further non-limiting example, when Advertising Broker is also a carrier or service provider (e.g., for services other than delivering communications sessions as described above), such as delivering broadband services, cable services, wireless services, alarm service, home automation service, or other similar services, the end devices used to provide access to such a service (e.g., VoIP equipment, routers, modems, access devices, alarm systems, home automation systems, etc.) can be included in Distributed Network Platform 149.

Advertising Broker 141 may have access to a Distributed Network Application Platform 149, for example, through an additional line of business. When the Advertising Broker 141 does not have a non-advertising line of business that provides a Distributed Network Application Platform 149, similar capabilities can be obtained by leasing access from others, using hosted devices, etc. This is discussed in more detail in relation to FIG. 10.

End Customers 120 communicating with system 100 may be tracked and indexed using one or more pieces of unique identifying information, referred to here as Customer Communications Identifiers. Customer Communications Identifiers can include (but are not limited to): incoming caller ID (CID) for conventional telephone calls; user identifiers for VoIP calls (for example SIP addresses, contacts, etc.); IP addresses (alone or in combination with other IDs); MAC addresses; browser IDs; unique URLs; browser or application cookies; smartphone identifiers (e.g., UDID (unique device identifier), IMEI (International Mobile Station Equipment Identity), IMSI (International Mobile Subscriber Identity) or other identifiers); consumer or enterprise device serial numbers (e.g., devices may be modems, telephony adapters, consumer electronics devices, tablets, eReaders, automotive systems, alarm systems, intelligent home devices, etc.); software license and version numbers; GPS locations; and application level IDs or login credentials.

Information about each End Customer 120 may be stored in the End Customer Database 145 and keyed by the customer Communications Identifier. Information may include tracking the number of times a customer has "called" (e.g., established a communications session using one or more associated Contact Identifiers), the time of day the customer communicated, duration of the communications session, whether this was a first time they have contacted Optimized Advertising Service 140, how much of the time they spoke, how long they were on hold, what mechanism (e.g., telephone, browser, application and application type) was used to connect, etc.

Additional information about End Customer 120 may also be stored in End Customer Database 145. The additional information may include one or more of: transactional information such as whether previous communications sessions resulted in a sale, the size of sales, patterns of purchases, whether the communications session was a repeat communications session to a particular Advertiser 110, how frequently they make calls, etc. The types of products purchased and types of Advertisers 110 (or others) contacted in the past may also be stored in End Customer Database 145. General demographic and economic information, such as gender, age, income, location, and interests may also be stored in End Customer Database 145. Preferred, native, and spoken languages may also be stored in End Customer Database 145.

Keywords extracted from communications sessions (as discussed below) may also be stored in End Customer Database 145. Address information, Contact Identifiers, credit card numbers, email addresses, user IDs or "handles" on communications and social media services, social security numbers, and additional identifying information may also be stored in End Customer Database 145. Behavioral information, such as how often a customer accepts offers presented to them, how often an "upsell" attempt succeeds with the customer, how often extended warranties are purchased, how often they are angry or stressed, and whether they hung up or attempted to avoid menus when interacting with an IVR system may also be stored in End Customer Database 145. Information about when, with whom, and what type of mechanism (e.g., contact identifier such as a telephone number and/or web URL to communicate over the web, etc.) the customer used in the past to find and communicate with various advertisers may also be stored in End Customer Database 145.

Information such as language patterns, speech patterns, and facial recognition information extracted from video communications sessions may also be stored in End Customer Database 145. This information serves as customer data, but can also be used as a mechanism to identify End Customers 120, serving as another form of Communications Identifier, even for anonymous communications sessions or communications sessions from new devices.

When the Advertising Broker 141 operates a Distributed Network Application Platform 149, extensive additional information may be obtained and stored in End Customer Database 145. Additional information may include all calls placed (e.g., when the case the platform operated is a telephony service); Internet locations visited or accessed (including web pages) (e.g., when routers, firewalls, NATs, modems, or other devices seeing significant network traffic are operated or Internet access is provided); consumer entertainment preferences (e.g., when consumer devices are operated); personal behavior characteristics such as times of day active, times of day at home, ideal temperature patterns, morning vs. evening riser, etc. (e.g., when home automation or security services are operated), and the like.

Information stored in End Customer Database 145 can be obtained from different sources using various mechanisms. Accordingly, flags may be attached to the information, for example, indicating how confident the system is in the accuracy of the information stored. Some of the information may be extracted directly from the customer communications sessions with End Customer 120. In some cases, information is shared by Advertisers 110 (for example information contained CRM systems and obtained via Advertiser Interface 146). Advertising Broker 141 may incentivize Advertisers 110 to share information by providing discounts on delivery of communications sessions to them, or by sharing information from other sources only with those willing to share themselves.

Information stored in End Customer Database 145 may also be collected through the Internet (directly). Optimized Advertising System 140 may search for information on the Internet and store it in End Customer Database 145 for later use. Access to information in external, third-party databases may be purchased and/or licensed and accessed information from the external, third-party databases may be stored in (or linked to) End Customer Database 145. We refer to any linked accessed data from leased or licensed databases as being part of End Customer Database 145 for simplicity.

Information may be directly extracted from the customer communications sessions with End Customers 120, for example, by recording or monitoring the communications session, and using text-to-speech, translation, natural language processing, linguistic analysis, and related techniques to understand content of the communications session. Information obtained via voice analysis may include: languages spoken, estimates of age and gender from voice analysis, stress levels, insights about level of anger, honesty or dishonesty, and sentiment of the caller (e.g., the End Customer 120), based on keyword, voice pattern, stress, tonal changes, etc. Additionally, transcriptions of interactions can be performed, either in real-time or after the customer communications session is completed. From these transcriptions, information such as keywords (including interests), credit card numbers (which can be correlated with other purchase information), addresses, and phone numbers can be extracted. For video communications sessions, additional information may be captured through facial and expression recognition, and may be correlated with information in (other) consumer databases. Using advanced analysis, information about whether the customer made a purchase or responded to an offer, and how they responded to sales pressure can also be determined, even if Advertiser 110 does not share such information through Advertiser Interface 146.

The information in End Customer Database 145 may be selectively shared by Advertising Broker 141 with the Advertisers 110 to improve the value of and provide background customer information for communications sessions delivered. Additionally or alternatively, the information stored in End Customer Database 145 may be selectively shared by Advertising Broker 141 with one or more Internet Content Services 130, for example, to improve the targeting of advertising or for other benefit to Advertising Broker 141 (e.g., direct remuneration).

The information in End Customer Database 145 may also be used directly by Advertising Broker 141 to generate revenue, for example, by generating tailored advertisements or offers for End Customer 120. Advertisements may be generated on behalf of Advertising Broker 141, or for any Advertisers 110 engaged as a client. Advertising Broker 141 may also work with Advertisers 110 to create special offers for their (prospective) customers, delivered in various ways by Optimized Advertising System 140.

Advertisements and offers may be provided at various times during a communications session initiated by End Customer 120 with Optimized Advertising System 140. For example, pre- or post-communications session messages may be provided. Information may be presented to human operators or to the CRM or IVR systems of an Advertiser 110 via Advertising Interface 146, allowing insertion of offers or advertisements (including those generated by the Advertisers 110 themselves using this information) during the communications session.

Offers and advertisements may be also be initiated asynchronously by the Optimized Advertising System 140. Optimized Advertising System 140 may generate offers and provide them to the End Customers 120. As Advertising Broker 141 maintains extensive information about Communications Identifiers associated with the End Customer 120, and may have additional contact information extracted through communications session with End Customer 120 (or otherwise obtained), different mechanisms to initiate offers and advertisements may be used. By way of non-limiting example, the mechanism include at least one of: calls, short messaging service (SMS) texts, or other telephony interactions using Communications Service 142; notifications sent, for example to applications, consumer devices, wearable devices, home automation devices, or other devices; advertisements placed with services the customer is known to use; placement of targeted banner advertisements; injection of data or media when the Advertising Broker 141 operates a Distributed Network Application Platform 149 used by End Customer 120; etc. The mechanism may be triggered by the Customer Database Walker Component 148.

These offers and advertisements may be completely untargeted or optimized to be (maximally) effective for a particular End Customer 120, based on data contained in the End Customer Database 145. Examples of ways the advertisement can be tailored include at least one of: based on demographic, socio-economic or other factors stored; targeted at preferred delivery mechanisms or time of day; based on the types of parties previously communicated with by End Customer 120; based on browsing, content consumption, behavior, or other patterns obtained from Distributed Network Application Platform 149; based on keywords spoken in previous interactions; based on behavior in previous interactions (responding to sales techniques that have worked, or identifying those that have or have not angered the customer); based on the mechanism used to find the Advertiser (e.g., via search engine, banner advertisement, crowd-sourced site, map/location search, etc.); etc.

In some embodiments, information not directly tied to the End Customer 120 may be combined with consumer information to target these advertisements and offers. End Customer 120's location and interest, combined with local interest items such as news and weather stories may be used to tailor offers. For example, local to End Customer 120's location may be within a predetermined radius from End Customer 120's location (e.g., 100 yards, 1 mile, 5 miles, 10 miles, 25 miles, and the like). By way of further non-limiting example, local to End Customer 120's location may be End Customer 120's location being within the boundaries/limits of a geofence, city, county, region, and the like. For example, if local news or weather indicates that a severe storm is coming, the system could be configured to prompt offers about roof repair, hail repair, cleanup services, or generators. If the weather data indicates extreme temperatures, information about climate control or indoor entertainment that might be of interest in such weather may be presented. News about recent burglaries may prompt offers related to alarm systems. If a pattern of individuals in the same geographical region as End Customer 120 is noted, similar products may be offered assuming that the customer may wish to also have that product. Offers likely to only be of interest in certain regions (for example due to availability, regional interests, weather, etc.) would be delivered only to End Customers 120 from those regions.

The advertisements or offers deemed to most closely match the interests of End Customers 120 may be presented, increasing the opportunity for sales for various Advertisers 110, but also increasing the appropriateness and desirability (e.g., relevance) of offers and advertising presented to End Customer 120.

Data stored in End Customer Database 145 may also be used to determine when to extend offers or present advertising. For example, when the data indicates it has been some (e.g., a predetermined amount of time, such as one day, one week, one month, three months, six months, one year, and the like) time since a particular one of End Customer 120 has last interacted with the Optimized Advertising System 140 (e.g., where the Advertiser 110 is associated with the offer or advertisement), this may result in a higher likelihood of a special offer being made, or of a more attractive discount being offered to the particular one of End Customer 120. End Customers 120 known to be more likely (e.g., determined using a number of (previous) responses received, number of offers (previously) made, and a predetermined time frame) to respond to offers may be made more offers during subsequent interactions.

Figure 2:
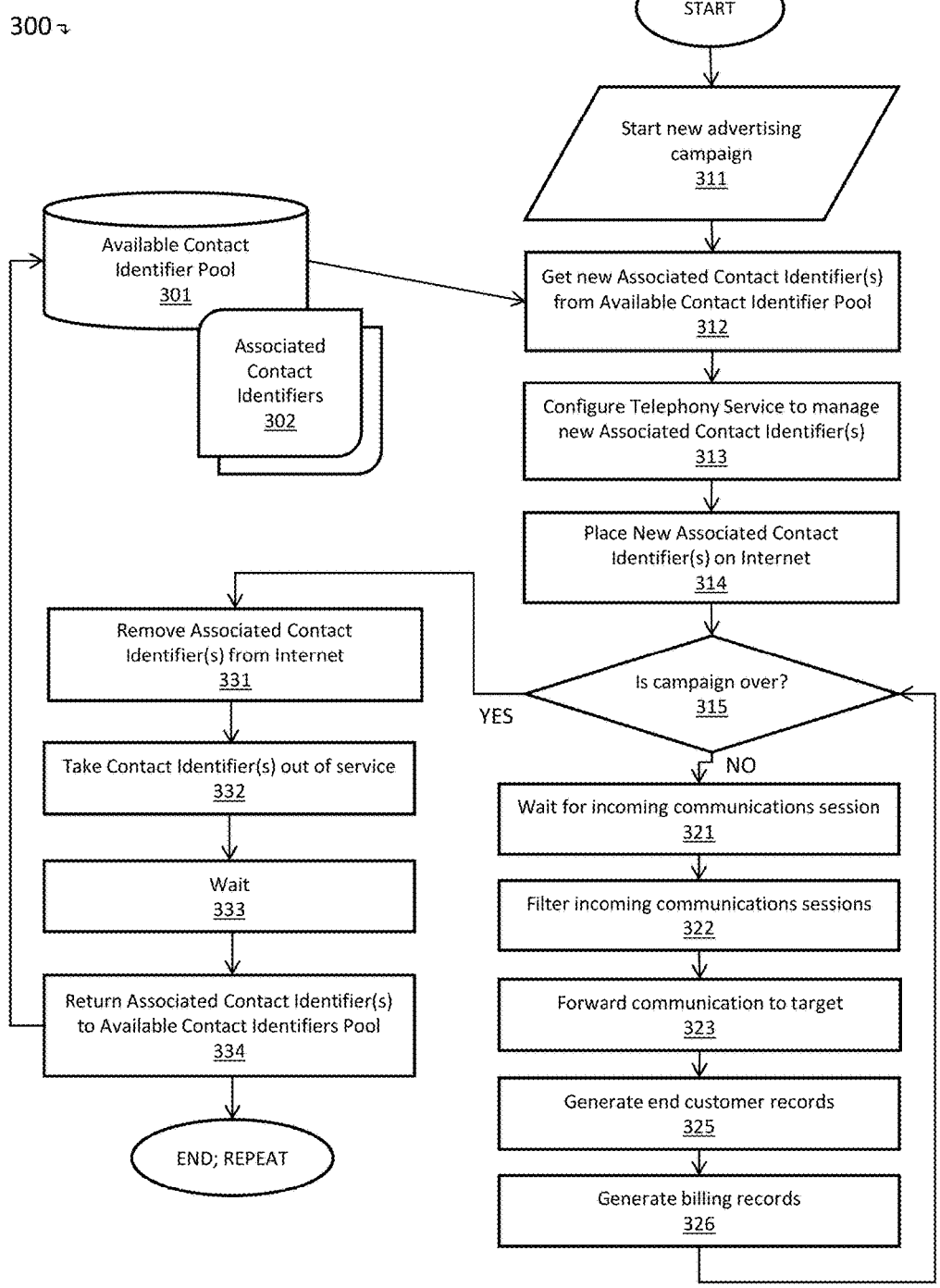
FIG. 2. illustrates a process diagram for the creation and operation of an advertising campaign with associated Contact Identifiers by an Optimized Advertising System.

FIG. 2 illustrates a process 300 for allocating one or more Contact Identifiers for communication with an Advertiser 110 as part of an advertising campaign, and managing that advertising campaign. In some embodiments, Optimized Advertising System performs at least some of process 300. Communications Service 142 can maintain an Available Contact Identifier Pool 301 of Contact Identifiers (as described above). The Contact Identifiers may be used by End Customers 120 to reach Advertisers 110. Associated Contact Identifiers 302 are selected from the Available Contact Identifier Pool 301 and assigned.

At step 311, an advertising campaign may commence. Step 311 may include offline administrative details, such as negotiation of contracts, payment rates for communications sessions received, payment rates for deals closed, determination of demographic or market segments to be targeted, etc. At step 312, one or more Associated Contact Identifiers 302 may be selected from Available Contact Identifier Pool 301. In some embodiments, when no telephone numbers are (temporally) available, additional numbers may be obtained and added to Available Contact Identifier Pool 301.

At step 313, Communications Service 142 may be configured to deliver customer communications sessions placed to Associated Contact Identifiers 302 to Advertiser 110, including configuration of supporting billing systems, call termination services, etc. At step 314, the Contact Identifiers may be associated with the advertiser on the Internet by: placing advertisements with Internet Advertising Services 131; placing links and advertisements on Internet Sites 133; associating Associated Contact Identifier 302 with Crowd-Sourced Services 132; initiating a social media campaign with one or more Social Media Services 134; including mechanism to reach the Associated Contact Identifiers 302 in one or more Device Applications 135; and ensuring the Associated Contact Identifiers 302 are returned in the results of one or more Search Providers 136.

At step 315, a campaign is checked to see it is still active. When the campaign is active, Communications Service 142 waits for incoming communications sessions at step 321, and if the campaign is completed, process 300 performs step 331. At step 331-334, Associated Contact Identifiers 302 may be returned to Available Contact Identifier Pool 301.

In various embodiments, there may be more than one Associated Contact Identifier 302 used for each campaign. For example, Multiple Contact Identifiers allow monitoring of which placements, and hence which Internet Content Services 130 have been most effective in reaching End Customers 120. By way of further non-limiting example, different Contact Identifiers may be used to track different types of End Customers 120 being reached, (e.g., to optimize/alter billing rates). By way of further non-limiting example, different Contact Identifiers may also be used to allow subsets within a campaign, or to allow different strategies to be tried (e.g., to track which have proven most successful).

At Step 321 an incoming customer communications session (e.g., "call") is placed/initiated by an End Customer 120 to Associated Contact Identifier 302. At step 322, call (or other forms of communications) may be filtered (e.g., as needed and/or desired). Filtering may include rejecting anonymous communications, filtering calls from known blacklisted callers (e.g., identifying undesirable calls using a black list), for example those that might be known to generate SPIT (SPAM over Internet Telephony) messages that are not relevant and should be ignored/rejected. The black list can be produced using reported SPIT (SPAM over Internet Telephony). Alternatively or additionally, filtering can include accepting calls from callers that are not on a black list.

In some embodiments, Advertising Broker 141 may also operate a network of devices used for consumer telephony (e.g., using consumer devices that comprise the Distributed Network Application Platform 149). For example, Advertising Broker 141 has many end customers for Communications Service 142 (e.g., including advertisers and (potentially) other consumer customers). Filtering in step 322 may use at least one of crowd-sourced black lists, crowd-sourced white lists, and algorithmically generated black and/or white lists using a large (e.g., statistically significant) number of data points maintained about incoming callers.

When a customer communications session is received, the communications session may be forwarded to an appropriate target selected using load balancing among targets. Load balancing is further described in relation to FIG. 3. The communications session may be forwarded to the selected target at step 323. For example, the selected target of the communications session may be one of Advertisers 110 and the communications session forwarded directly to them. By way of further non-limiting example, the communications session may be (alternatively or additionally) forwarded to an agent on behalf of Advertiser 110 (e.g., handled by Advertising Broker 141 on Advertiser 110's behalf). By way of further non-limiting example, the selected target may be a company engaging Advertisers 110. For example, Advertisers 110 may be an agent for another entity to whom the communications sessions are ultimately delivered. In other words, the communications session may be directed to Advertiser 110 and/or to an agent or service acting on behalf of Advertiser 110.

In some embodiments, the customer communications session may be forwarded to an interactive voice response (IVR) system or other automated system (e.g., instead of a live person), capable of interacting with End Customer 120 without human involvement. The interactive voice response (IVR) system or other automated system may be located at Advertiser 110 (or their agent's) premises, and/or operated by Advertising Broker 141 as part of Communications Service 142. The communications session may also be delivered to a voice mail system or similar system for recording, a TTY device, translation service, or other mechanism to interact with the target. Finally, these communications sessions may also be delivered in forms other than voice, such as at least one of video, text, a photo, other messaging application, and the like.

At step 325, any recorded media (e.g., audio, video, text, still images, etc. from the communications session) associated with End Customer 120 (e.g., generated during or at the end of the communications session) may be sent to End Customer Management System 144 and stored in End Customer Database 145. Information may be obtained using the recorded media as described above, and/or shared with Advertisers 110 (e.g., using the Advertiser Interface 146).

At step 326, Advertising Broker 141 may generate communications records for billing Advertiser 110 for the received communications session. These may include information such as the communications session duration, geographical location of the caller, caller ID information, whether the communications session is from a new (not previously engaged) End Customer 120 (optionally increasing a payment rate) rather than a returning End Customer 120, and other information pertinent to billing. In some embodiments, Advertiser 110 may also independently maintain records of communications sessions including time received, duration, disposition, etc., and use the independently maintained communications records to reconcile the communications records from Advertising Broker 141 during billing.

Process 300 may return to step 315 (e.g., after the customer communications session completes and the billing and customer records have been generated) to determine if the advertising campaign is over and if not, wait for the next customer communications session.

When the advertising campaign is completed (e.g., determined at step 315), process 300 continues to step 331, where advertising is disabled by removing Associated Contact Identifiers 302 from the Internet. This may include at least one of: canceling advertisements with Internet Advertising Services 131, removing advertisements or listings from Internet Sites 133, de-registering Associated Contact Identifiers 302 from Crowd-Sourced Services 132 and Search Providers 136, and removing contact mechanisms from Device Applications 135. In some embodiments, it may be impractical to remove the entries, for example, when a Contact Identifier has been shared by End Customer 120 (e.g., rather than directly by actions of Advertising Broker 141), placed in print or other less ephemeral (e.g., persistent) advertising media, or in locations where entries are time stamped and may not be easily altered. When entries cannot practically be removed, the numbers are left to "decay." For example, after a predetermined amount of time, the contact identifier will simply not work. By way of further non-limiting example, communications to a contact identifier may be redirected, the caller (e.g., the End Customer 120) presented with an announcement, etc.

At step 332, Communications Service 142 may perform at least one of: generating an appropriate "out of service" message to be provided (e.g., played) when Associated Contact Identifier 302 is "called;" recording the communications sessions placed to Associated Contact Identifier 302; and taking some other action appropriate to removing Associated Contact Identifiers 302 from service.

In some embodiments, Advertising Broker 141 may monetize taking the Associated Contact Identifier 302 out of service. For example, when recordings are taken from callers (e.g., the End Customer 120), the recordings may be offered and sold to the Advertiser 110 that has discontinued the campaign. By way of further non-limiting example, announcements and/or notifications about the communications sessions that have been missed may be generated, and the announcements and/or notifications provided to Advertiser 110 (e.g., delivered via at least one of: email, SMS, push notifications to an application, notifications via a telephone call or other communication, generated reports, sending alerts to a wearable device, etc.) that recently discontinued service. In some embodiments, the announcements and/or notifications may indicate Advertiser 110 has missed a potential customer communications session (e.g., to persuade Advertiser 110 to resume the campaign and/or avail themselves of further paid marketing services).

In various embodiments, the Associated Contact Identifier 302 taken out of service can be used further (e.g., for another purpose). For example, if another (different) Advertiser 110 offering a similar product or service wishes to capitalize on the now abandoned Associated Contact Identifiers 302, they may pay for the privilege. When End Customers 120 communicates with the "disabled" Associate Contact Identifier 302, a message might play stating that the party is unavailable, but press a number/button (or take some other action/provide input on a non-telephone device) to be connected to another party offering similar services. The customer communications session could also be redirected to the new Advertiser 110 without announcement or comment. The Associated Contact Identifier could be configured to play an advertisement for the new Advertiser 110 when contacted, or take some other action promoting or delivering the End Customer 120's business to the new Advertiser 110. For example, some advertising may be left in place at step 331, and process 300 proceeds to step 311 to configure the new campaign with the new Advertiser 110 (not depicted in FIG. 2).

In some embodiments, where a new Advertiser 110 is not available to use the ("abandoned") Contact Identifier, the Contact Identifier could simply be configured such that when reached, it will play advertising to generate revenue for Advertising Broker 141. This advertising can be at least one of: tailored toward either the line of business of the original Advertiser 110, customized using known information about End Customers 120 (from End Customer Database 145), and simply random advertising. As the Contact Identifier was previously placed in many (persistent) locations, some of which may still be encountered by End Customers 120, the incoming communications session traffic may still have value and this "residual advertising" can provide another source of revenue for Advertising Broker 141.

At step 333, the now disabled Associated Contact Identifier 302 may remain unavailable (or in alternate use) for some period of time, with communications sessions handled as described above in step 332, to reduce the chance that when reused, incoming communications sessions from a previous campaign will reach the Associated Contact Identifier 302 and that any residual advertising has time to generate value. This determination may be simply based on a timer (e.g., wait 30 days), or may be algorithmic (e.g., wait until no more than a certain number of communications sessions arrive at the Contact Identifier (either in total number, or number for a unit of time (e.g., each day, hour, etc.)).

At step 334, the Associated Contact Identifier 302 may be returned to Available Contact Identifier Pool 301 and may be reused in a future campaign. In some embodiments, there may be a large number of available identifiers (e.g., URLs) and some other non-telephone number identifiers, such that unique identifiers may not have to be reused for non-traditional communications mechanisms.

Figure 3:
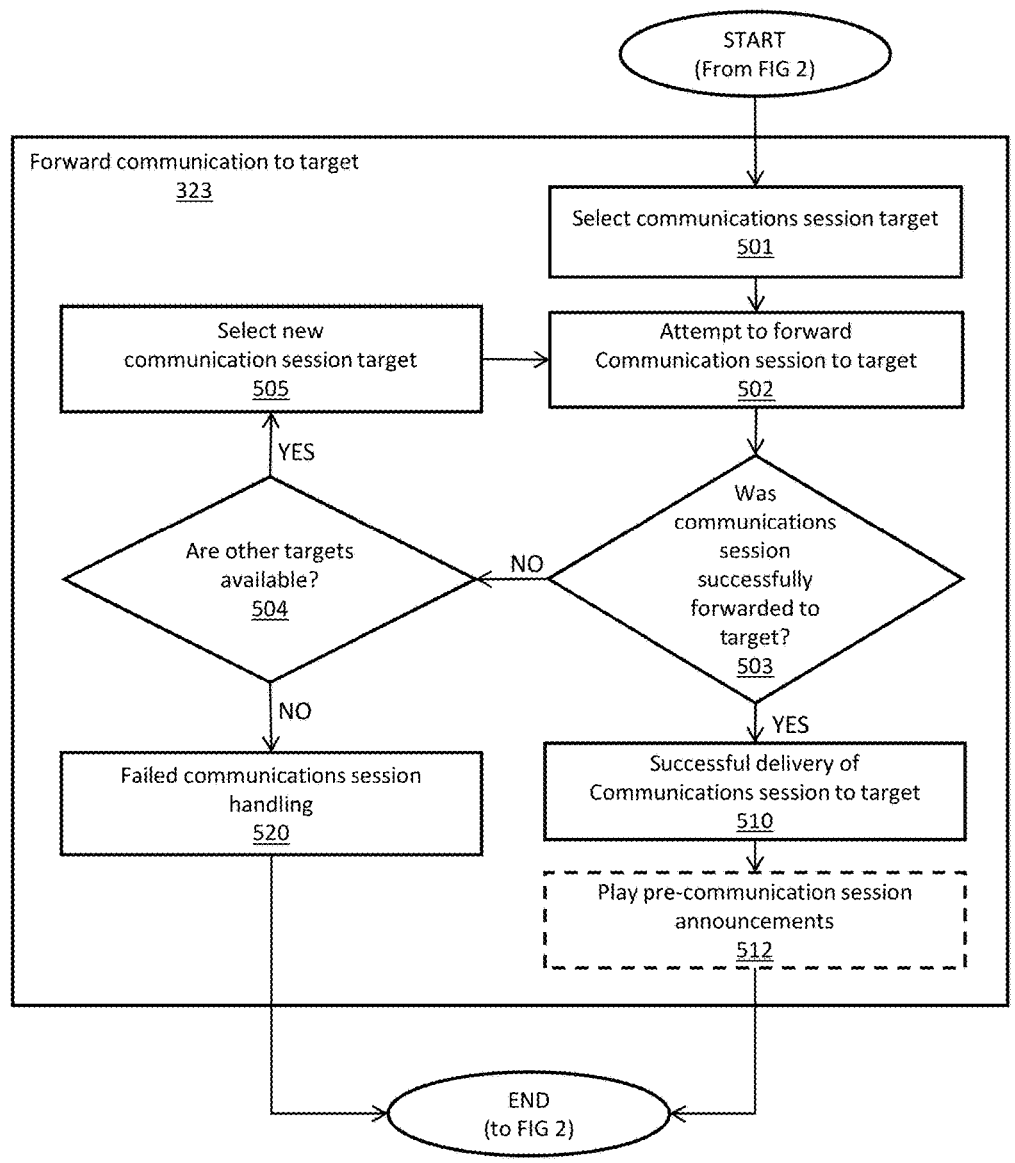
FIG. 3. illustrates a process diagram detailing the selection of a target to terminate an incoming consumer communications session to an Optimized Advertising System, highlighting how multiple targets are handled.

FIG. 3 illustrates a process 500 for load balancing communications sessions placed to an Associated Contact Identifier 302 from End Customers 120 among Advertisers 110 (or other entities on behalf Advertisers 110 as described above). For example, load balancing may be used when more than one intermediary agent is selling a service on behalf of an ultimate manufacturer or service provider. Both agents may contract Advertising Broker 141 to obtain traffic derived from a (shared) Associated Contact Identifier 302 and the Advertising Broker 141 may wish to "load balance", or distribute these communications sessions among the various targets (e.g., Advertisers 110). Process 500 illustrates further details of step 323 of process 300 (FIG. 2). In some embodiments, when only one Advertiser 110 is available, process 500 may be performed (e.g., significantly including optional step 512 below), but for a single possible target.

When End Customer 120 communications session is received for forwarding, a "target" may be selected at step 501. In some embodiments, a target is a selected one of a plurality of Advertisers 110, or their agents as described above, including automated systems such as IVRs. For example, selection of the target may include optimizing customer experience or maximizing revenue for Advertising Broker 141. Customer-oriented optimizations may include general availability, for example determining which targets (e.g., Advertisers 110) are currently open for business (e.g., based on a (local) time of day), have available agents to handle the communications session (e.g., based on information exchanged with Advertisers 110), or have the shortest wait time (e.g., based on information exchanged with the target). In some embodiments, metrics may be used to select a target to optimize for customer experience and/or be used to optimize (e.g., maximize) profit for Advertising Broker 141. For example, one or more of Advertisers 110 may be selected based on which is willing to pay the most (a "highest-profit routing" approach). In some embodiments, contracts may stipulate that one of Advertisers 110 will only pay for a certain number of communications sessions in a given period (e.g. one week or one month), and delivering additional communications sessions to the one of Advertisers 110 may be unprofitable (e.g., not result in additional revenue). In some embodiments, both approaches may also be used (e.g., combined), selecting for example the highest paying target, so long as customer wait time is not too long. Another way that the target may be selected is through a live auction of information. This is discussed further below in relation to FIG. 4.

When a target is selected, at step 502 the customer communications session may be forwarded to the target Advertiser 110. At step 503, a check is made to determine whether the communications session was forwarded to the target successfully. When forwarding is not successful (e.g., due to network failure), at step 504 the availability of other target Advertisers 110 to receive this communications session is determined. When other target Advertisers 110 are available to receive this communications session, a new "next best" target is selected at step 505, using similar techniques as used at step 501 to select the optimal new target, and the communications session is forwarded to the new target, at step 502.

When the communications session is determined to be properly routed to the target at step 503, it is deemed delivered, as indicated at step 510.

Optionally at step 512, pre-communication session (pre-call) announcements may be played. Different pre-communications session announcements may be played to the caller (e.g., the End Customer 120) and the target. For the target, the announcement could include valuable information about the End Customer 120 placing the call, extracted from the End Customer Database 145 maintained by Advertising Broker 141. The information can be any information contained in End Customer Database 145 that Advertising Broker 141 chooses to and is allowed to share, and could include (but is not limited to) contact information, demographic information, location information, information about previous buying habits, about the types of organizations this End Customer 120 has called in the past, etc. The announcement may also include a brief message informing the target that this communications session has been delivered by Advertising Broker 141 (e.g., reinforcing the value of the relationship in the mind of the target).

For the caller (e.g., the End Customer 120), additional advertising or targeted offers may be provided (e.g., played). The providing may include information that is at least one of: related to the products or services of Advertiser 110 and unrelated to the Advertiser 110 and delivered on behalf of Advertising Broker 141 or one of their (other) Advertiser 110 clients. These advertisements and offers may be customized according to at least one of the End Customer 120 or the desires of one or more Advertisers 110, using information from End Customer Database 145, using information obtained through Advertising Interface 146, or using information from other sources. The various mechanisms used to customize advertising and offers for End Customer 120 based on data from End Customer Database 145 and other sources as was described above.

In some embodiments, a form (e.g., media) of the announcement may be selected based on the mechanism used to communicate. For example, announcements may be delivered as at least one of: audio, video, text message, picture message, notification (for example in a mobile application, CRM software, custom developed software, to a wearable device, etc.), or other mechanism.

When the customer communications session is determined to have failed at step 503 and no other target Advertisers 110 are available at step 504, failed communications session handling at step 520 may be invoked. Failed communications session handling may include at least one of: generating an error message instructing End Customers 120 to try again later, Advertising Broker 141 handling the communications session on behalf of the target, recording a message from End Customers 120, and some other error handling.

Process 500 may proceed to step 325, for example, after delivering the customer communications session or handling a failed communications session.

Figure 4:
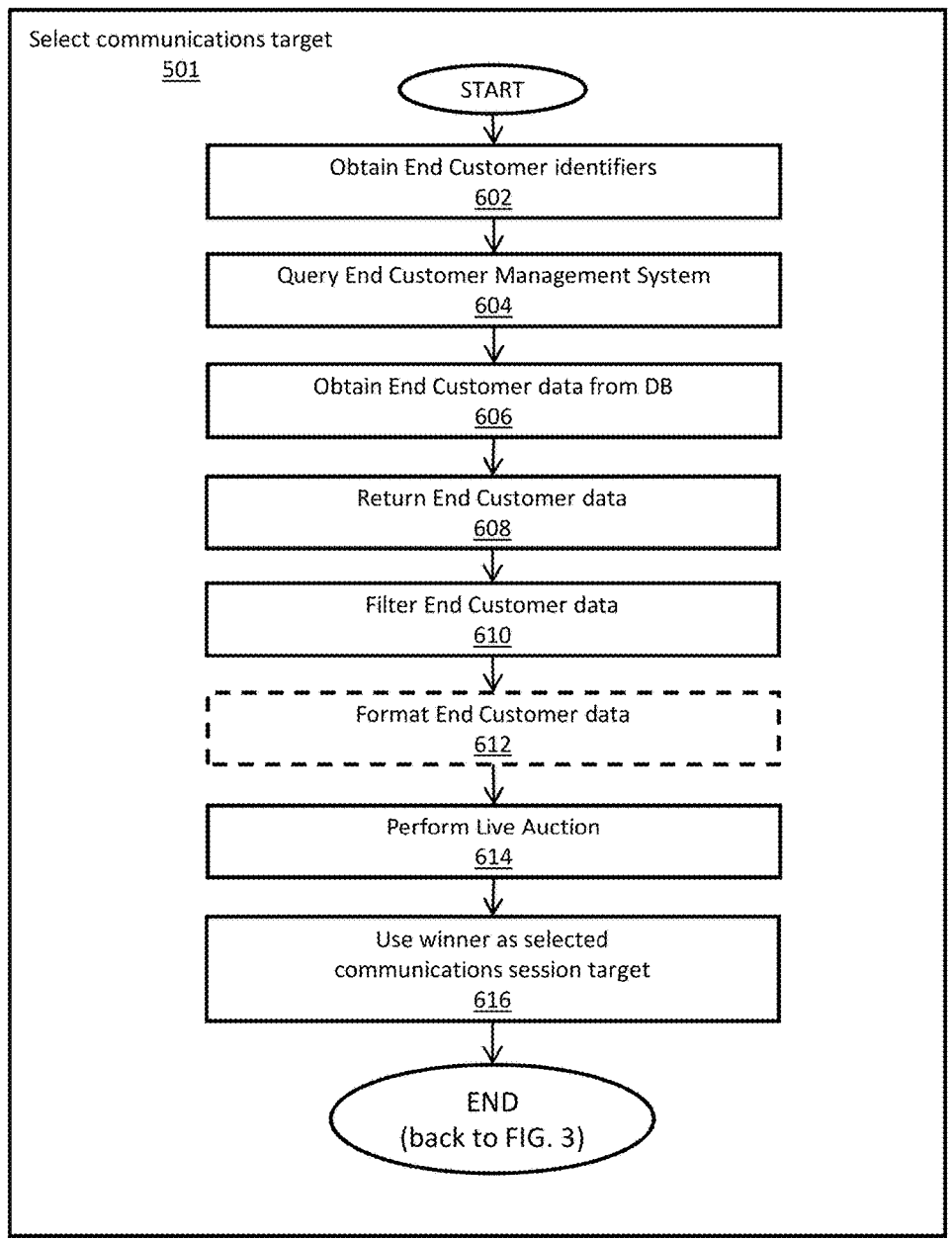
FIG. 4. illustrates a process diagram for performing a live auction to determine which target handles an incoming consumer communications session, as performed by an Optimized Advertising System.

FIG. 4 illustrates a process 600 for conducting (or contracting an operator to conduct) a live auction as the target selection mechanism, using data about End Customer 120. Process 600 illustrates further details of step 501 of process 500 (FIG. 3).

At step 602, the Communications Service 142 may be queried to obtain the Customer Communications Identifiers (described above), which may uniquely identify End Customer 120. At step 604, End Customer Management System 144 may be queried using the Customer Communications Identifiers, which may query End Customer Database 145 to retrieve information related to the End Customer 120 at step 606. At step 608, any information found is returned.

As explained above, End Customer Database 145 may contain information obtained through communications sessions processed by the Optimized Advertising System 140 and information obtained from other sources, including the Internet, or through other (third-party) consumer databases. In some embodiments, data made available by one or more Advertiser 110 and their agents through Advertiser Interface 146 (e.g., data from the Advertiser 110 or their agents' CRM) may be integrated (e.g., stored in End Customer Database 145, queried directly from the CRM of the customer (via Advertiser Interface 146) and combined, and the like).

At step 610, the obtained data may be filtered by the OAS Controller Component, using rules configured by Advertising Broker 141. The filtered data may be used to create a profile of the End Customer 120 initiating a communications session. The filtered data may also be used by various bidders in the live auction to determine if they are interested and the price the various bidders are willing to pay to be connected to that End Customer 120. The filtering of information may also be used to hide information or data that Advertising Broker 141 either wishes not to share, or cannot share due to legal and/or contractual obligations.

Optionally at step 612, the information may be formatted. For example, when an external service is used to perform the auction on behalf of Advertising Broker 141, the information obtained about the customer in steps 602-610 is formatted as needed/required by that service.

At step 614, the live auction may be conducted by Advertising Broker 141 directly, or by a different (third-) party that facilitates the live auction on Advertising Broker's 141 behalf. At step 616, the winner of the live auction may be selected and used as the target for the customer communications session. Process 600 may return to step 502 (FIG. 3).

Figure 5:
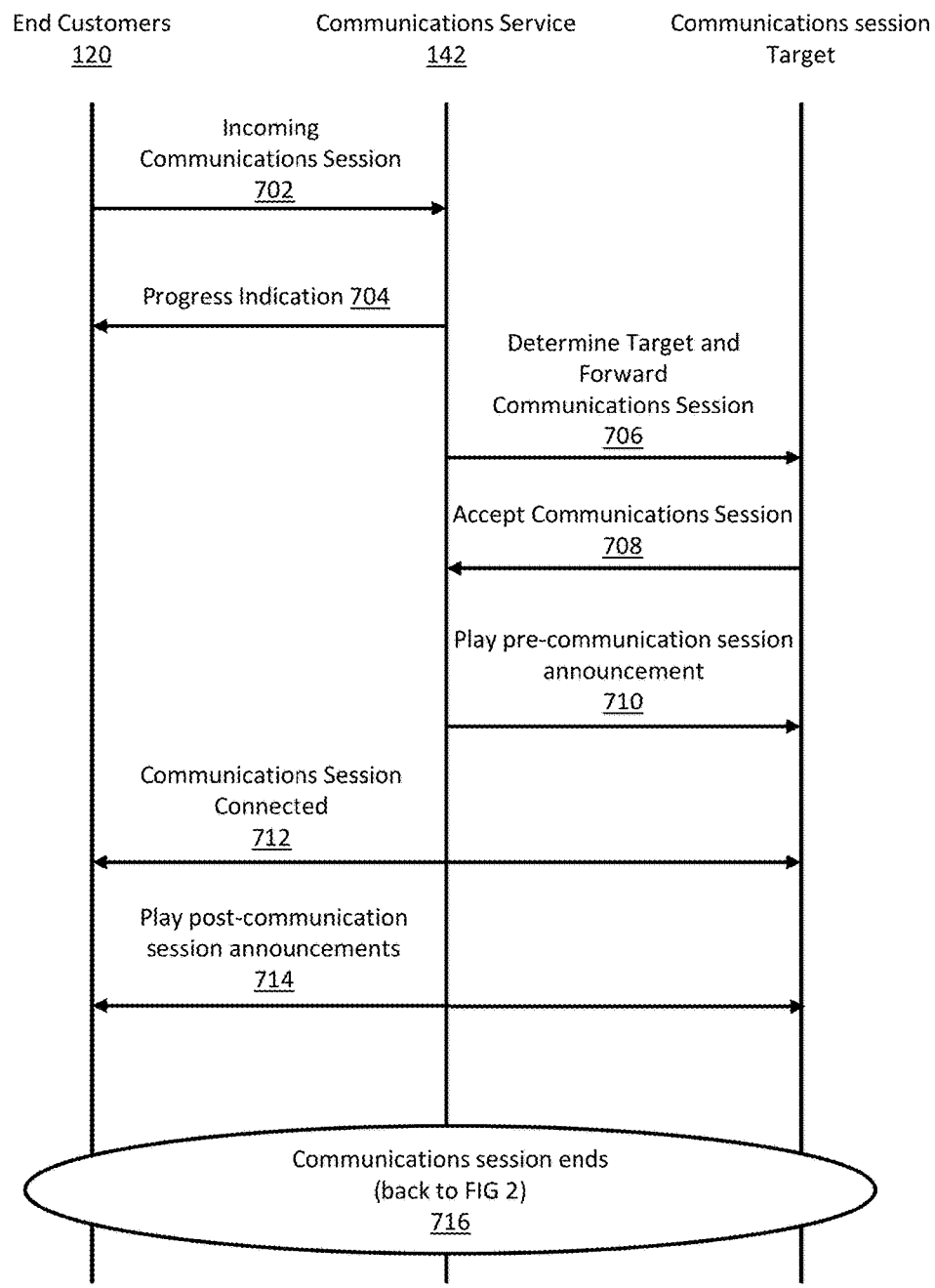
FIG. 5. illustrates a ladder diagram (call flow) for an incoming consumer communications session, executed by a Communications System forming part of an Optimized Advertising System.

FIG. 5 is a simplified ladder diagram showing process 700 for directing a customer communications session from an End Customers 120 to a target. FIG. 5 (similar to FIG. 3) illustrates in further detail step 323 (FIG. 2). Although a conventional "call" to a traditional phone number is depicted, other processes for communications sessions may be used, for example, at least one of: delivered over networks using URLs, delivered over IM, initiated from a mobile or PC application, initiated by consumer devices, wearables, etc., as well as for communications sessions in the form of at least one of: voice, video, IM, virtual or augmented reality or image, not only voice.

At step 702, an incoming customer communications session from one of End Customers 120 may arrive at Communications Service 142. The communications session may be handled by at least one of a: soft-switch, proxy server, telephony router, video server, call processor, gateway, session processing software, web server, IM server, etc., or some similar devices or combination thereof. At step 704, the communications session is received by the Communications Service 142, and a progress indication (e.g., a ring tone in the case of a traditional telephone call) may be played to the End Customer 120 (e.g., while the communications session is connected to the target).

In some embodiments, the progress indication may include messages required for legal purposes (e.g., indicating that the communications session may be at least one of: monitored, transcribed, recorded, and analyzed). The progress indication may alternatively or additionally include music, a viral tone, a branded tone or announcement, or other messages (e.g., "your call is important to us"). The progress indication may also include an advertisement or offer. The various types of advertisements or offers, and how they are delivered were described earlier in relation to step 512 (FIG. 3).

At step 706, Communications Service 142 may determine a target for the communications session and deliver the communications session to the target. For example, the target may be an Advertiser 110 or an agent acting on behalf of an Advertiser 110, and further may be a human or a computerized system. As described in relation to FIG. 3, determining a target may include several attempts to find a successful target. In some embodiments, step 706 may correspond to steps 501-505 (FIG. 3).

At step 708, the target may accept the communications session (e.g., corresponding to step 510 (FIG. 3)). At step 710, the (optional) pre-communication session announcement may be played to the target (e.g., as described in relation to step 512 (FIG. 3)). In some embodiments, at least one of an application (e.g., mobile, CRM, wearable, etc.), web page being used for communications (or along with communications systems), and other notifications may be displayed in place of or with the notification delivered by the communications session. Additionally or alternatively, messages required for legal purposes (e.g., indicating that the call may be monitored, transcribed, recorded, analyzed, etc.) may be presented.

At step 712, the customer communications session may be connected between the target and End Customer 120, and the target and End Customer 120 may communicate (e.g., using at least one of: audio, video, text, image, virtual or augmented reality, etc.).

At step 714, post-communication session messages may be generated to both the End Customer 120 and the target (e.g., after the communications session is complete). For the caller (e.g., the End Customer 120), the post-communication session messages may include at least one of: advertising, surveys, thank you messages, etc. The various types of advertisements or offers and how they are delivered were described earlier in relation to step 512 (FIG. 3). For the target, (important) post-communications session information, as well as other content (e.g., similar to that described in relation to the pre-communications session announcement) may be delivered. For example, post-communications session information and/or other content may take the form of other notifications in accordance with the mechanisms used to communicate.

At step 716, the communications session may end and process 700 proceeds to the end customer record generation and billing at steps 325 and 326 (FIG. 2).

Information collected by End Customer Management System 144 and stored in End Customer Database 145 may be made accessible to Advertisers 110 (and/or their agents)

through Advertiser Interface 146 (e.g., in accordance with rules governing information Advertising Broker 141 chooses to share). In some embodiments, Advertiser Interface 146 may be used to allow Advertisers 110 to monitor transactions in real time, and to better understand at least one of their customers, their competitors, and their advertising campaigns.

Figure 6:
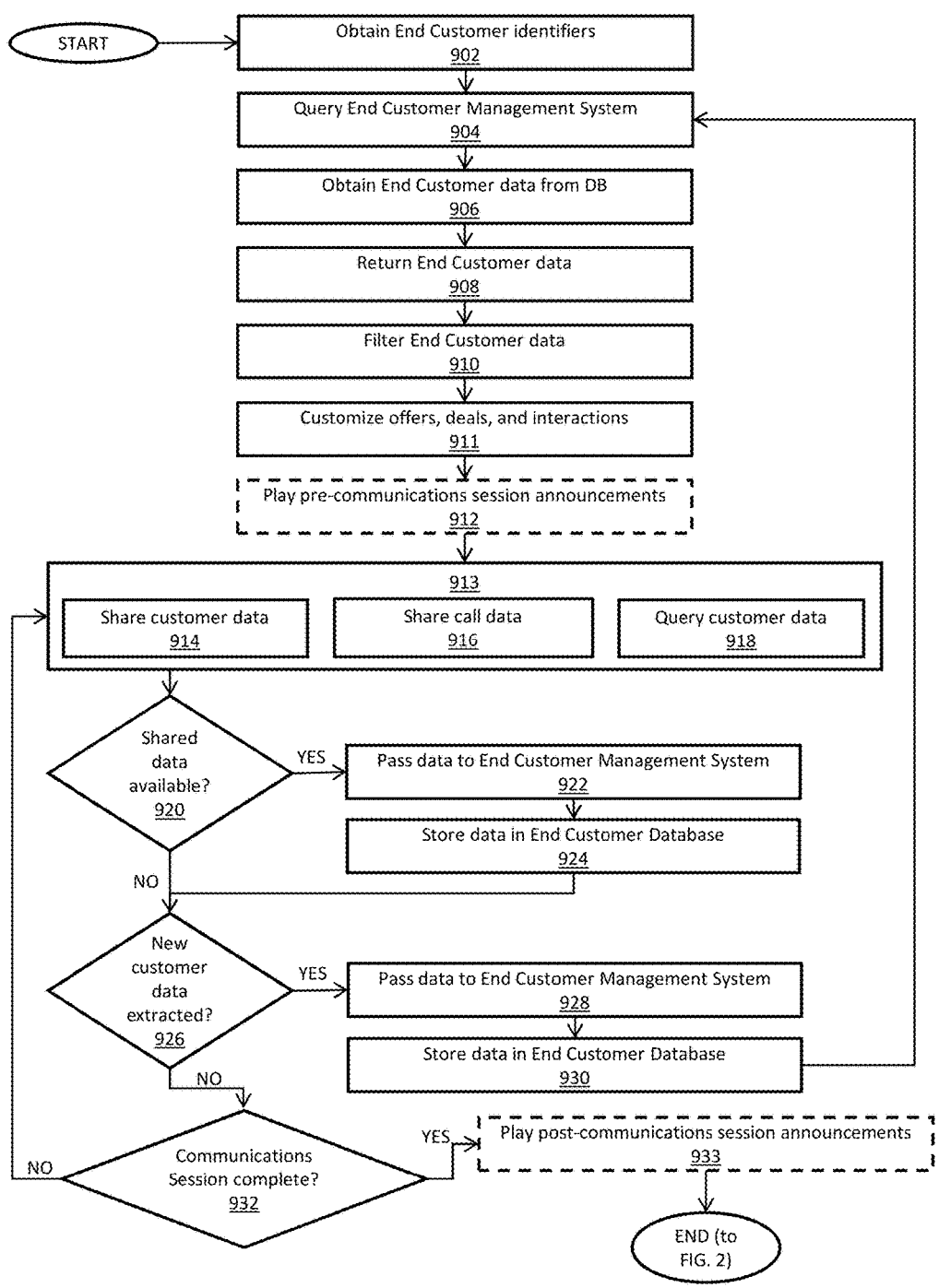
FIG. 6. illustrates a process diagram illustrating the process of retrieving customer data, making it available in numerous ways before, during, and after a customer communications session, and capturing new data obtained during that session, as performed by an Optimized Advertising System.

FIG. 6 illustrates a process 900 for End Customers 120 communicating with Advertiser 110 and/or their agents. Advertisers 110 and/or their agents may obtain information in real time during the customer communications session using Advertising Interface 146. Process 900 may begin with an incoming communications session being delivered to a target, either Advertisers 110 or their agent (e.g., step 323 in FIG. 2). In some embodiments, process 900 may be controlled by the OAS Controller Component 147 and/or Optimized Advertising System 140.

At step 902, the Communications Service 142 may be queried to obtain the Customer Communications Identifiers, described above, which uniquely identify End Customer 120. At step 904, End Customer Management System 144 may be queried using the Customer Communications Identifiers, which may query End Customer Database 145 to retrieve information related to the End Customer 120 at step 906. At step 908, any information found is returned.

At step 910, the resulting data may be filtered (e.g., using rules configured by Advertising Broker 141). For example, Advertising Broker 141 chooses not to share certain highly valuable customer data it deems confidential, and/or may only provide certain levels of information, depending on the contracted service level for Advertiser 110. Additionally, Advertising Broker 141 may be contractually obligated not to release some customer information (e.g., information obtained through a transaction with a competitor of Advertisers 110, information licensed under particular terms, confidential, or may be legally bound by privacy or data management laws to restrict information shared on certain customers, within certain locations, etc.).

At step 911, special offers and advertisements, tailored to the consumer based on information obtained in steps 902-910 may be generated. Special offers and advertisements may be offered as pre-communication session messages (e.g., as described in relation step 704 (FIG. 5) (and step 912 below)) presented in-call (e.g., presented by the operator as discussed below, played just before connecting to the operator, etc.) and/or offered in post-communication session announcements (e.g., as discussed in relation to step 714 (FIG. 5) and step 933 below. The various types of advertisements or offers, and how they are delivered were described above in relation to step 512 (FIG. 3). Offers and advertisements may also be selected or adjusted to reflect how recently (e.g., within and/or outside a predetermined amount of time, such as one day, one week, one month, three months, six months, one year, and the like) the End Customer 120 has contacted the Advertiser 110, their behavior, and their buying habits, etc.

In some embodiments, offers may also be extended based on instructions from the Advertiser 110, using the information obtained at steps 902-910 not to identify the particular customer needs, but instead when a customer matches a desired profile. For example, when an objective of Advertiser 110 is to increase sales in a particular region, the offer may be extended to all callers from that region (e.g., regardless of other factors). The profile may correspond to any segment that can be determined from the information obtained at steps 902-910, including location, age, gender, income, etc.

At optional step 912, pre-communications session announcements (if any) may be played to the caller (e.g., as described in relation to step 704 (FIG. 5)) and to the target (e.g., as described in relation to step 710 (FIG. 5)).

At step 913, at least one of three steps, steps 914, 916, and 918 may be performed simultaneously. At step 914, the end customer data retrieved and filtered in steps 902-911 may be provided to Advertisers 110 and/or their agents. In some embodiments, the data includes information such as the name and phone number of End Customers 120, and information to present the End Customer 120 in a map view. The data can also include displaying any offers or advertising selected to be shared with End Customer 120 at step 911. Demographic data, behavioral data (e.g., conversion rates, offer acceptance rates, etc.), local information, earlier goods purchased, types of organizations the customer interacts with, how End Customer 120 reached Advertiser 110 (e.g. Contact Identifier such as at least one of a telephone number, web URL to communicate over the web, etc.), and any other data stored in End Customer Database 145 (described earlier) may also be shared.

The data may also be provided to the Advertisers 110 and/or their agents through the Advertiser Interface 146, which may take many forms, as described earlier. In some embodiments, a visual presentation of the data, along with similar information in the case of an IVR, may be presented to Advertiser 110.

In some embodiments, information about interactions that Advertiser 110 had directly with this End Customer 120 can be correlated with the information that is presented by Advertising Interface 146. For example, a Customer Relationship Management system (CRM), either operated directly by Advertisers 110 or hosted and managed as part of Optimized Advertising System 140, could combine the information shared by Advertising Interface 146 with Advertiser 110 specific information in the CRM.

Collectively, the information can provide an extremely detailed and insightful view into the customer contacting Advertiser 110.

At step 916, in-call data, obtained from Communications Service 142, may be concurrently made available. In-call data can include at least one of: the on hold time before the communications session was handled and the information obtained from real time analysis (e.g., voice stress-analysis) of the communications session. In-call data can be made available by Advertising Interface 146 to supervisors and other senior management at Advertisers 110 and/or their agents, and can be used, in combination with the data described above, to identify high-value customers that are becoming unhappy during a communications session, such that a supervisor may intervene to address the high-value customer's concerns.

At step 918, information may be concurrently shared from Advertisers 110 or their agents back to the Optimized Advertising System 140 using Advertising Interface 146. For example, when the Optimized Advertising System 140 is integrated with the systems of Advertisers 110, information about whether the communications session has resulted in a sale, whether up sale techniques have succeeded, and any additional customer information that Advertiser 110 or their agents may have obtained may be shared. In some embodiments, Advertising Broker 141 may provide strong and compelling incentives for Advertiser 110 share this information, for example, a discount on communications session services, sharing of additional information by Advertising Broker 141 that they may otherwise not be shared, and the like.

At step 920, whether any new customer information was shared at step 918 may be determined. When new customer information was not shared at step 918, process 900 proceeds to step 926. When new customer information was shared at step 918, the information may be forwarded to End Customer Management System 144 at step 922, and at step 924 End Customer Management System 144 adds this information (e.g., keyed by the unique customer identifiers obtained at step 902) to End Customer Database 145. Process 900 then may proceed to step 926.

At step 926, Communications Service 142 may be queried to check whether any additional information was extracted from the communications session which may be added to the database for End Customers 120, and optionally shared with Advertisers 110 via Advertiser Interface 146. For example, voice analysis and/or speech-to-text capabilities in Communications Service 142 may identify new information about the caller (e.g., the End Customer 120). The new information may include at least one of: gender or age estimates from voice; names, addresses, or other information spoken during the communications session; payment information such as credit card numbers spoken during the communications session, which can be correlated with other information; responsiveness to sales pressure during the communications session; algorithmic estimates as to whether a sale was completed; stress levels during the communications session; keywords of interests; facial recognition or expression analysis for video communications sessions; or other information extracted from the media stream. In some embodiments, basic call information that might be added to End Customer Database 145 may be included at this step.

When additional information is extracted, the additional information may be provided to the End Customer Management System 144 at step 928, and stored in the End Customer Database 145 at step 930. Process 900 may proceed to step 904, where the database may be reexamined, potentially resulting in some of the new information being shared, and process 900 may repeat. If no new data was extracted at step 926, process 900 proceeds to step 932.

At step 932, whether the customer communications session is completed is determined. When the customer communications session is still in progress (e.g., not completed), process 900 may repeat by returning to step 913.

When the customer communications session is completed, post-communications session announcements (e.g., described in relation to step 714 of FIG. 5) may be played at optional step 933. Process 900 may then return to process 300 (FIG. 2) (e.g., where additional incoming customer communications sessions may be handled).

Figure 7:
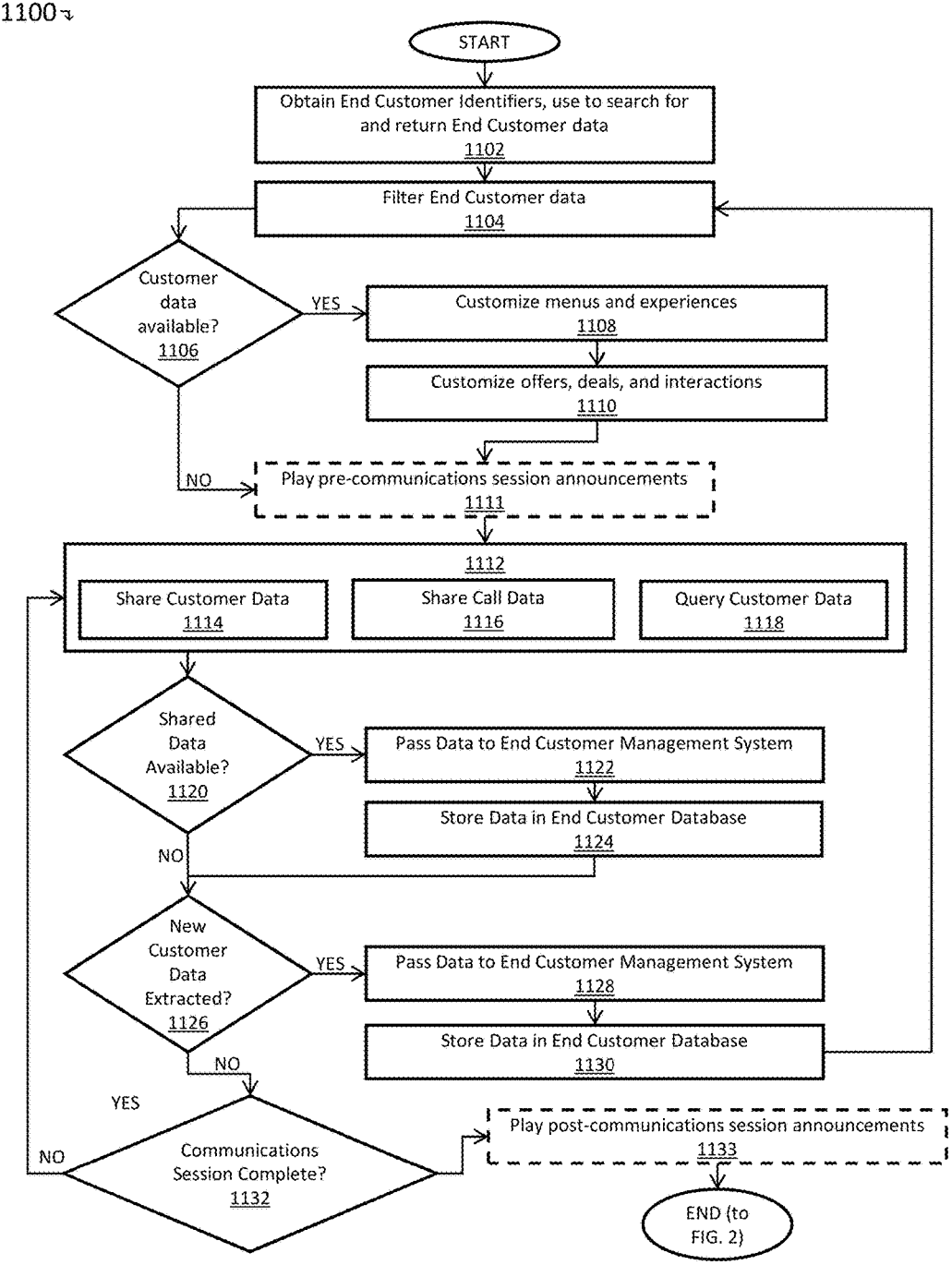
FIG. 7. illustrates a process diagram illustrating the process of retrieving customer data, using it to customize the user experience, making it available in numerous ways before, during, and after a customer communications session, and capturing new data obtained during that session, when the session is performed by an automated system, as performed by an Optimized Advertising System.

A similar approach may be taken when End Customer 120 is directed not to a live agent, but to an IVR system. FIG. 7 shows a process 1100 for using an Optimized Advertising System 140 to deliver communications sessions to an IVR system, using the end customer data stored in End Customer Database 145. In some embodiments, an IVR system may be hosted by the Optimized Advertising System 140 and may omit using the Advertising Interface 146 to provide information to the Advertisers 110.

In various embodiments, the IVR may also be located at the Advertisers 110 or their agents' premises, and the information may be provided to the IVR through the Advertiser Interface 146. The IVR system may use interactive video, text, image, virtual or augmented reality, or other mechanisms. Interactions (e.g., using "menus") may include input such as voice input and button presses, as well as other ways of interacting with the system, for example, through menus and visual presentations on applications (e.g., mobile, consumer devices, wearable, and the like), physical controllers or displays on hardware devices, gestures, etc.

Process 1100 may commence in response to an incoming customer communications session being delivered to a target, either by Advertisers 110 or their agent (e.g., step 323 in FIG. 2). In some embodiments, process 1100 may be controlled by the OAS Controller Component 147 and/or the Optimized Advertising System 140.

At step 1102, the Communications Service 142 may be queried to obtain the Customer Communications Identifiers, described above, which uniquely identify End Customer 120. Step 1102 may also include querying End Customer Management System 144 using the Customer Communications Identifiers, which may query End Customer Database 145 to retrieve and return any information related to the End Customer 120. For illustrative purposes only, step 1102 may be analogous to steps 902-908 (FIG. 6), but is presented as one step in FIG. 7 for simplicity.

At step 1104, the resulting data may be filtered, using rules configured by Advertising Broker 141, as described in step 910 of FIG. 6.

At step 1106, availability of relevant End Customer 120 data to customize the interactions of the IVR is determined. When relevant End Customer 120 data is available, process 1100 proceeds to step 1108. When relevant End Customer 120 data is not available, process 1100 proceeds to step 1112 (optionally step 1111).

At step 1108, the menus and experience (which may be presented in different ways according to the device used) of the system for End Customers 120 may be customized based on the information obtained at steps 1102 and 1104. For example, using information in the database about at least one of demographic, financial, and behavioral patterns of the End Customer 120, the selections/choices presented may be vary. In some embodiment using traditional IVR, calls may be more or less quickly escalated for personal attention based on the perceived value of the customer, and menu options that may be irrelevant the customer may be eliminated using the information (e.g., from steps 1102 and 1104).

At step 1110, special offers and advertisements tailored to the consumer based on information (e.g., obtained at steps 1102 and 1104) may be produced. Similar to step 911, the special offers and advertisements may be presented in at least one of the following ways: during the pre-communication session, as part of the IVR (or similar service) interactive experience, during the post-communication session, and presented asynchronously after the communications session has been completed. The various types of advertisements or offers, and how they are delivered, were described above in relation to step 512 of FIG. 3.

At optional step 1111, pre-communications session announcements (if any) may be played to the caller (e.g., as described in relation to step 704 (FIG. 5)) and to the target (e.g., as described in relation to step 710 (FIG. 5)).

At step 1112, three steps 1114, 1116, and 1118 may be performed simultaneously. At step 1114, the end customer data retrieved and filtered in steps 1102-1110 may be provided to Advertisers 110 or their agents. In some embodiments, as described in relation to step 914 (FIG. 6), the end customer data may comprise of any data from the End Customer Database 145 configured by the Advertising Broker 141 to be shared, for example, with Advertiser 110 using Advertiser Interface 146, described above in relation to step 914 in FIG. 6.

Concurrently at step 1116, in-call data (e.g., obtained from Communications Service 142) may be provided. In-call data may include the information described in relation to step 916

(FIG. 6). In some embodiments including a traditional IVR, in-call data may also include at least one of: choices/selections made (e.g., input received), number of incorrect or "angry" button presses, detection of angry or stressed vocalizations (e.g., cursing, screaming, complaining, etc.), detecting repeated returns to the same spot in an IVR tree (e.g., customer is stuck in a loop), etc. In some embodiments including non-traditional interactions (e.g., from web pages, applications, consumer devices, etc.), similar/analogous information indicating how the End Customer 120 interacted with the application may be shared for example, with Advertiser 110, described above in relation to step 916 in FIG. 6.

Concurrently at step 1118, information can be shared from Advertisers 110 or their agents back to the Optimized Advertising System 140 using Advertising Interface 146, as described in relation to step 918 (FIG. 6).

At step 1120, whether new customer information was shared at step 1118 is determined. When new customer information was not shared at step 1118, process 900 continues to step 1126. When new customer information was shared at step 1118, the new customer information may be provided to End Customer Management System 144 at step 1122, and at step 1124 End Customer Management System 144 may add this information, keyed by the End Customer 120 unique identifying information obtained at step 1102, to End Customer Database 145. Process 1100 may continue to step 1126.

At step 1126, Communications Service 142 may be queried to check if any additional information has been extracted from the communications session that could be added to the database for End Customers 120, and potentially shared with Advertisers 110 via Advertiser Interface 146, as described in relation to step 926 in FIG. 6. In some embodiments including a traditional IVR system, information about choices made, number of incorrect or "angry" button presses, detection of angry or stressed voice responses, etc., as described above, may be added to the database. For non-traditional interactions (e.g., from web pages, applications, consumer devices, etc.), analogous information showing how the End Customer 120 interacted with the application is provided to be added to End Customer Database 145.

When additional information has been extracted, the additional information may be passed to the End Customer Management System 144 at step 1128, and stored in the End Customer Database 145 at step 1130. Process 1100 may move back to step 1104, where the database is reexamined, potentially with the new information that may be shared, and the process 1100 may repeat. When no additional information was extracted at step 1126, process 1100 moves to step 1132.

At step 1132, the system may check to see if the communications session has been completed. If not, the process repeats upon returning to step 1112.

When the communications session is completed, post-communications session announcements (if any, as described in relation to step 714 of FIG. 5) may be played at optional step 1133. Process 1100 may end, and process 300 (FIG. 2) may resume such that further incoming customer communications sessions are handled.

In some embodiments, information shared with Advertisers 110 and/or their agents may be shared in the form of a caller dashboard. For example, the caller dashboard may include an enhanced live caller ID (CID) in the case of a dashboard for a traditional phone/IVR system. In some embodiments, Advertiser 110 and/or their agents may watch—in real time—and see who is communicating with them. Relevant information about the End Customer 120 obtained at steps 902-911 (FIG. 6) and/or steps 1102-1104 (FIG. 7) may be presented, as well as relevant in-"call" information, for example, at least one of: stress and other information extracted from voice analysis; keywords extracted from the communications session in progress through voice analysis; the choices being made on a menu tree (e.g., selections made in the IVR); the total time spent on the communications session; total on hold time; whether rapid key presses or repeated incorrect choices were received (e.g., potentially indicating a dissatisfied customer for which intervention is required); whether menus are being skipped; etc. In various embodiments including non-traditional interactions (e.g., from web pages, applications, consumer devices, etc.), analogous information showing how the End Customer 120 interacted with the application may be added to the End Customer Database 145.

The live dashboard can also indicate, graphically, where customers are contacting the Advertiser 110 from (e.g., based on area code, prefix, or number for traditional calls; IP addresses or identifiers from apps or the Internet, GPS, etc.). Other information can be presented, for example, regions which have the most callers (e.g., the End Customer 120) that are taking advantage of offers defined at step 911 (FIG. 6) and/or step 1110 (FIG. 7), which communications sessions are converting into sales, etc. As discussed in relation to steps 913-918 (FIG. 6), other information stored in the End Customer Database 145 or Advertiser 110 and their agents systems (made available through Advertiser Interface 146) may also be presented in the live dashboard.

Figure 8:
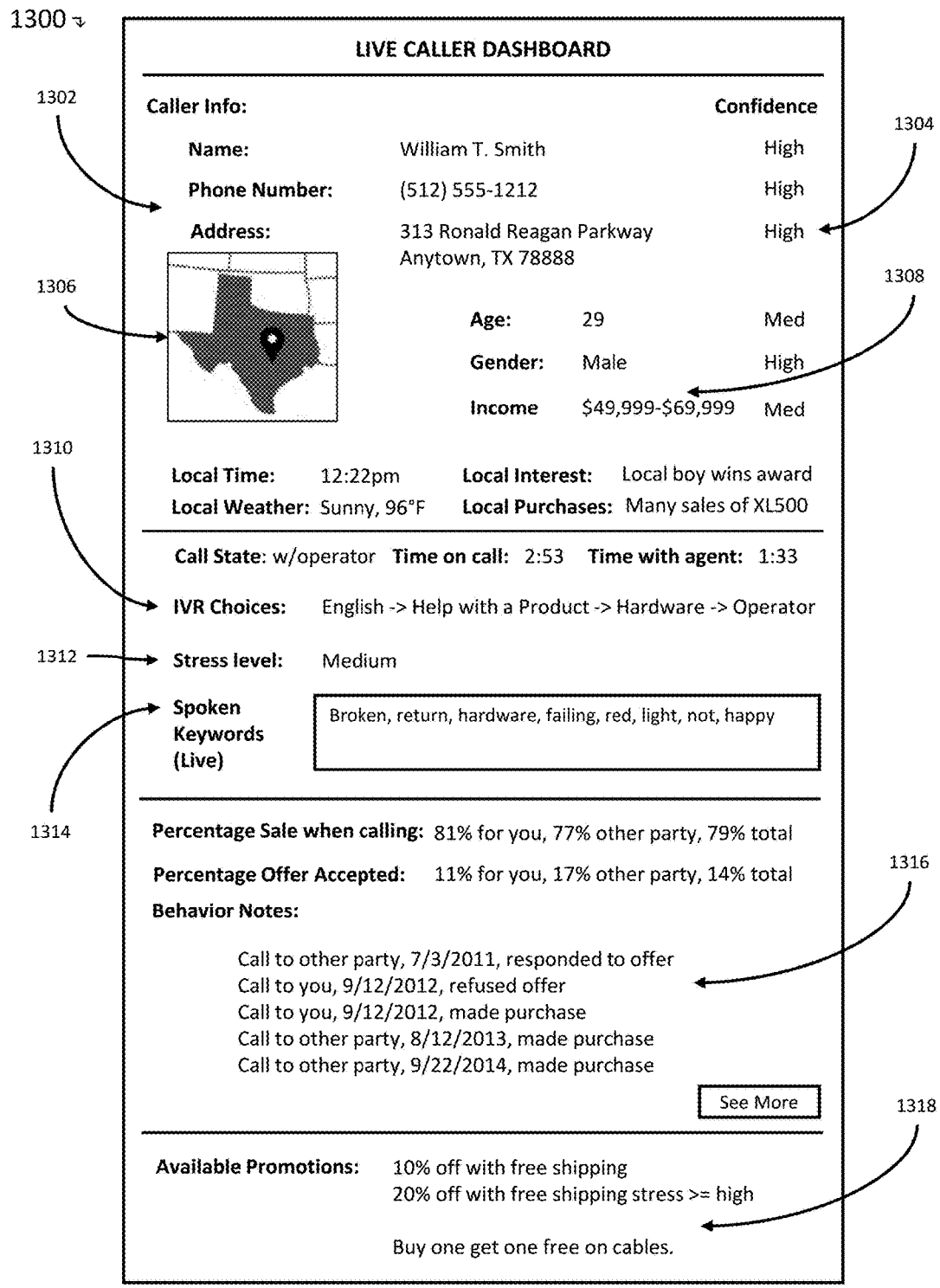
FIG. 8. illustrates a sample interface for presenting customer data to the target during a consumer communications session in an exemplary implementation of an Optimized Advertising System.

FIG. 8 illustrates an exemplary embodiment of a user interface 1300 for a live dashboard. Although a basic web page-like system is shown purely for illustrative purposes, other visual presentations (e.g., presentation, graphs, figures, heat maps, color coding, etc.) may be used. For example, controls/information could be presented as at least one of a mobile application (e.g., an Android or iOS application), through a virtual or augmented reality application, and a standalone software application (e.g., Windows or Mac OSX application, or an application running on some other device). The controls/information could also be provided via API through Advertising Interface 146, and integrated into other Advertiser 110 systems, for example as a web page or application on the premises of Advertiser 110 and/or their agents, or integrated into other applications of the Advertiser 110 or their agents, such as a CRM, call center package, social media page, or other software. Displays and controls may also be implemented in other ways, for example, at least one of: using physical displays and controls (e.g., buttons, knobs, etc.), in a virtual reality or augmented reality fashion, in braille, controlled through gestures, presented as audio, controlled through spoken commands, etc.

Information displayed using user interface 1300 may be received from the End Customer Database 145 and from information shared from Advertisers 110 via Advertiser Interface 146 (e.g., steps 914-918 (FIG. 6) and/or steps 1114-1118 (FIG. 7)).

Information 1302 illustrates presentation of basic caller data. By way of non-limiting example, Name, Phone Number, and Address are depicted, but additional information may also be displayed. In some embodiments, confidence level 1304 may be included in user interface 1300. Confidence level 1304 may indicate how confident the Optimized Advertising System 140 is with the information presented. For example, information that is deemed highly reliable (e.g., the phone number obtained from caller ID, a name obtained from the phone provider, and the like) would have a high confidence level 1304. In contrast, information inferred from voice analysis in previous communications sessions may be marked medium, low, or some other value indicating the information is less certain. In some embodiments, confidence level 1304 may be at least one of: high, medium, and low.

Section 1306 shows a map view and relevant local information from the caller's location (e.g., local time, local weather, a brief comment about an event of local interest, a list of items that are being purchased frequently in this area, etc.). The map view and relevant local information may be useful for communications (e.g., building rapport) with the End Customer 120 (e.g., by an agent), and to sell (e.g., by an agent) the items listed in local purchases or related to local events to the End Customer 120.

Section 1308 includes demographic information, which may have been collected from, for example, previous communications sessions. For illustrative purposes, section 1308 includes age, gender, income, and associated confidence levels.

Reference signal 1310 illustrates communication session information. In some embodiments, information associated with a conventional telephone call reaching an agent through an IVR system is illustrated. The current state of the call (e.g., with agent/operator), as well as time on call and time with an agent may be shown, although additional information could be presented. Additionally, a call tree flow, illustrating the choices made by the customer while engaged with the IVR, may be shown.

Reference signal 1312 indicates the current stress level (e.g., inferred by voice analysis). In various embodiments, the stress level may be indicated using text, a meter, graph, or other visual indicator, and an alert could be raised with a supervisor if the level becomes too high.

Reference signal 1314 depicts a live list of keywords, extracted by voice analysis, spoken by the caller (e.g., the End Customer 120). The live list of keywords may provide insight into the purpose of the call, be used to identify interests of this caller at a later time, and be used to index a communications session later when searching for calls about a particular item or subject.

Section 1316 illustrates information about the caller's behavior in previous engagements, both with the Advertiser 110 called and with other called parties. In some embodiments, the percentage of times a communications session resulted in a sale, as well as the percentage of offers accepted, may be illustrated. The information can be used to determine how hard to push a caller (e.g., the End Customer 120) to convince them to take an offer. Notes about behavior on previous communications sessions and the dates of those calls may also be presented.

Section 1318 shows offers (e.g., "available promotions") available to this caller (e.g., as determined at step 911 (FIG. 6) and/or step 1110 (FIG. 7) are presented, so that they may be shared with the customer. Promotions created for End Customer 120 can also be for other parties, not just for Advertiser 110. This can result in revenue for Advertiser 110. The various types of advertisements or offers, and how they are delivered were described earlier in relation to step 512 (FIG. 3).

For example, when an End Customer 120 calls Advertiser 110, the profile of that End Customer 120 matches a profile desirable to a (different, second) Advertiser 110, and the (originally called) Advertiser 110 is willing, a special offer from (different, second) Advertiser 110 is generated. This "cross promotion" may be tightly controlled by (originally called) Advertiser 110, to prevent undesirable advertisements, for example, for competitors or for organizations with which they do not agree or feel their customers may find unsavory, unwanted, or irrelevant. Cross promotion provides both a way for advertisers to reach customers they may not otherwise have reached, and to allow monetization of communications sessions received, in addition to simply selling products or services.

Since Optimized Advertising System 140 may have access to information not only about calls to a particular Advertiser 110, but also other organizations (including other Advertisers 110), as well as information about all the End Customers 120 calling these Advertisers 110 (e.g., in End Customer Database 145), additional interesting information can be obtained in the form of performance benchmarks. For example, through Advertiser Interface 146 the Optimized Advertising System 140 can make available information regarding how an Advertiser 110 compares in terms of call performance compared to other entities, most notably entities of comparable size and in similar industries. This could include comparing the actual number of communications sessions received per day; the geographic reach of Advertiser 110 compared to other entities; conversion rates, offer acceptance rates, and other sales information; number of repeat callers, etc. Any information tracked by End Customer Database 145 can be used to benchmark how one Advertiser 110 interactions with End Customers 120 compares with other Advertisers 110.

Figure 9:
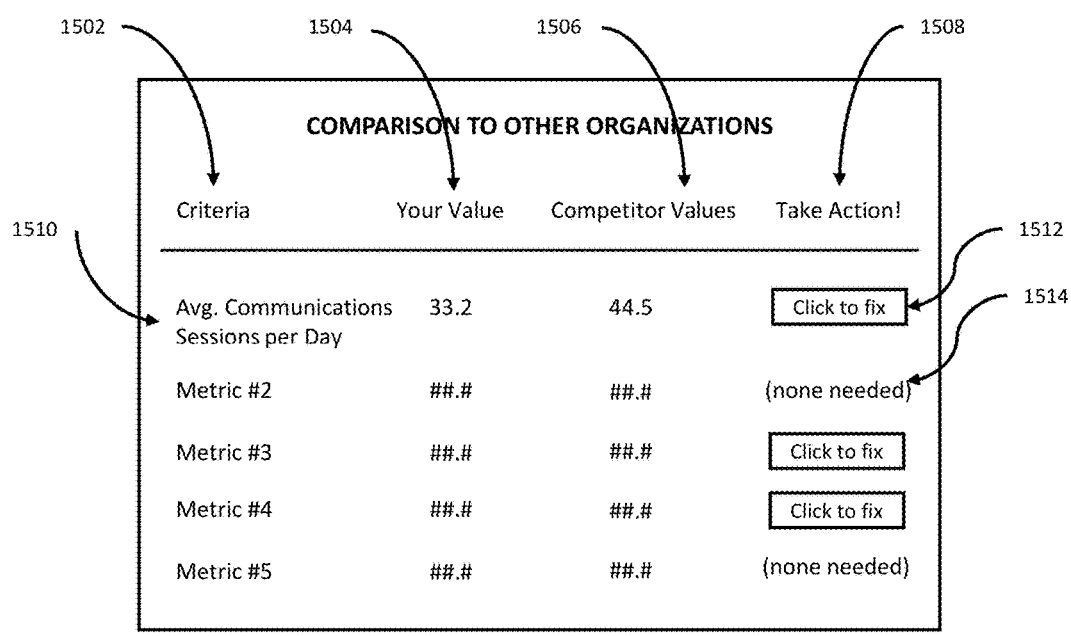
FIG. 9. illustrates a sample interface for analyzing advertiser metrics and taking action in an exemplary implementation of an Optimized Advertising System.

Benchmarking information may be used to indicate to Advertiser 110 areas where their current sales efforts are weaker than similar entities. This can be used to suggest different advertising strategies, to identify the source of weaknesses (e.g., identifying potentially underperforming call center staff if similar companies have much higher conversion rates), etc. In some embodiments of Optimized Advertising System 140, Advertiser Interface 146 is used to provide a direct, immediate mechanism to remedy problems found. FIG. 9 shows a web page 1500 providing an interface to such a system, according to some embodiments. Although a basic web page 1500 is shown for illustrative purposes, other visual presentations (e.g., as described above in relation to FIG. 8) may be used.

Basic web page 1500 includes four columns. Column 1502 may list a particular metric or criteria being reported on, and compared against comparable entities. Column 1504 may illustrate the value for Advertiser 110, and Column 1506 may list the value for comparable businesses. Column 1508 may provide clickable options that allow immediate actions to be chosen from to address this problem. For example, in row 1510, the Average number of communications sessions per day may be listed. For example, for the Advertiser 110 this is shown as 33.2, with comparable entities averaging 44.5. By clicking on the button 1512 in row 1510, a menu of options to address this problem may be presented. For example, options include at least one of: placing additional advertisements, using mechanisms to promote on social media, or other mechanisms to help address that particular metric. A particular action not being needed may be indicated, as shown by 1514. For row 1510, a criteria 1502 being Average Communications sessions per Day is presented for illustrative purposes. By way of non-limiting example, criteria 1502 may be at least one: communications sessions per day, conversions of sales, number of offers presented to customers, number of offers accepted by customers, number of customers reaching a human agent, number of customers requiring intervention due to detection of stress, etc.

Selecting (e.g., clicking on) an action in row 1508 may create additional revenue for Advertising Broker 141, while being designed to increase the reach of Advertiser 110.

In various embodiments, the above benchmarking and suggestion tools described above can be run against an Advertiser 110's existing call information. As an example, before Advertiser 110 becomes a customer, Advertising Broker 141 may run the benchmarking tool against existing Advertiser 110 data in an effort to show them how Advertising Broker 141 could help them by using an Optimized Advertising System 140.

In some embodiments, the benchmarking described above may include analysis of existing records of calls to the Advertiser 110's current traditional phone system. Conventional communications systems may produce records of calls, called CDRs (Call Detail Records) that can be used to produce an interactive comparison and suggested actions, such as an action in column 1508, illustrated in FIG. 9, except analyzed and comparted to existing data. While only a portion of the information of the information available in Optimized Advertising System 140 will be available (e.g., detailed data captured from voice analysis and the like may not be available), significant value may still be created by analyzing and comparing to existing data. For non-traditional systems, similar records may exist. For example, in web-based communications, web access logs can be used to track when and how many End Customers 120 have contacted the Advertiser 110. Similarly, when an Advertiser 110 becomes a new customer, older data may be imported into Optimized Advertising System 140 to allow viewing of older data to understand longer term trends.

An Internet advertisement campaign according to some embodiments, may also include making information about Advertisers' 110 available in numerous locations on the Internet. For a system designed to optimize telephony advertising, it means maximizing the number of Internet locations displaying Associated Contact Identifier 302 and maximizing the rankings or ratings of those placements to increase the chance they are seen. The locations where the information needs to be placed may include direct advertisement "buys" using Internet Advertisement Services 131, advertisements placed on Internet Sites 133, or posting on Social Media Services 134, but may also consist of placing information on Crowd-Sourced Services 132.

As an example of using Crowd-Sourced Services 132, an Advertiser 110 for a national alarm monitoring service may want to have their Contact Identifier (an Associated Contact Identifier 302 from FIG. 2) associated with the local location of any installers of alarms in a particular geographical area when an End Customer 120 searches for "alarm services" on an Internet map software application (e.g., Bing Maps, Apple Maps, and the like), or crowd-sourced review site (e.g., Yelp, Angie's List, and the like).

For sites or services that are at least partially crowd-sourced, their user interfaces are typically optimized for humans, rather than machines to interact with them, such that intervention by Advertising Management System 143 may be used to interact with the sites or services properly. These services often do not incorporate a published Application Programming Interface (API). An API allows interaction with a particular Internet location to retrieve or place data in a well understood, programmatic way, and can be used to place an advertisement in an Internet location (e.g., website). In contrast, sites or services optimized for human use may provide no such interface. Even sites or services that do provide APIs may change the APIs without warning.

For sites or services that do not provide APIs, a technique known as "scraping" may be used. In scraping, the human-readable page is automatically converted into data format for use by a machine (e.g., a template). When scraping to read information, the content from an entire web page may be retrieved, and software "scrapes" away only the important, underlying information in a way that is readable by machines. Any unnecessary information, including presentation and graphics (e.g., which may be important to human users, but is irrelevant for machines) is removed, leaving the raw data. Examples of the sort of information removed could include banner advertisements, instructions, headings and titles, logos, user interaction buttons, etc. Similarly, for placing or entering information, a site oriented towards humans may include filling in information in a few specific fields and pressing a "send" button or using a similar mechanism to transmit the data. These fields may require data be formatted in a particular way, for example requiring phone numbers be formatted as (XXX) XXX-XXXX rather than XXX-XXX-XXXX (e.g., where each "X" can be any number). An automated tool may take machine-readable information and format it to appear as correct entries from a human user to the Internet site or service (e.g., using the template). In this way, templates can be used to place an advertisement in an Internet site (e.g., website).

Figure 10:
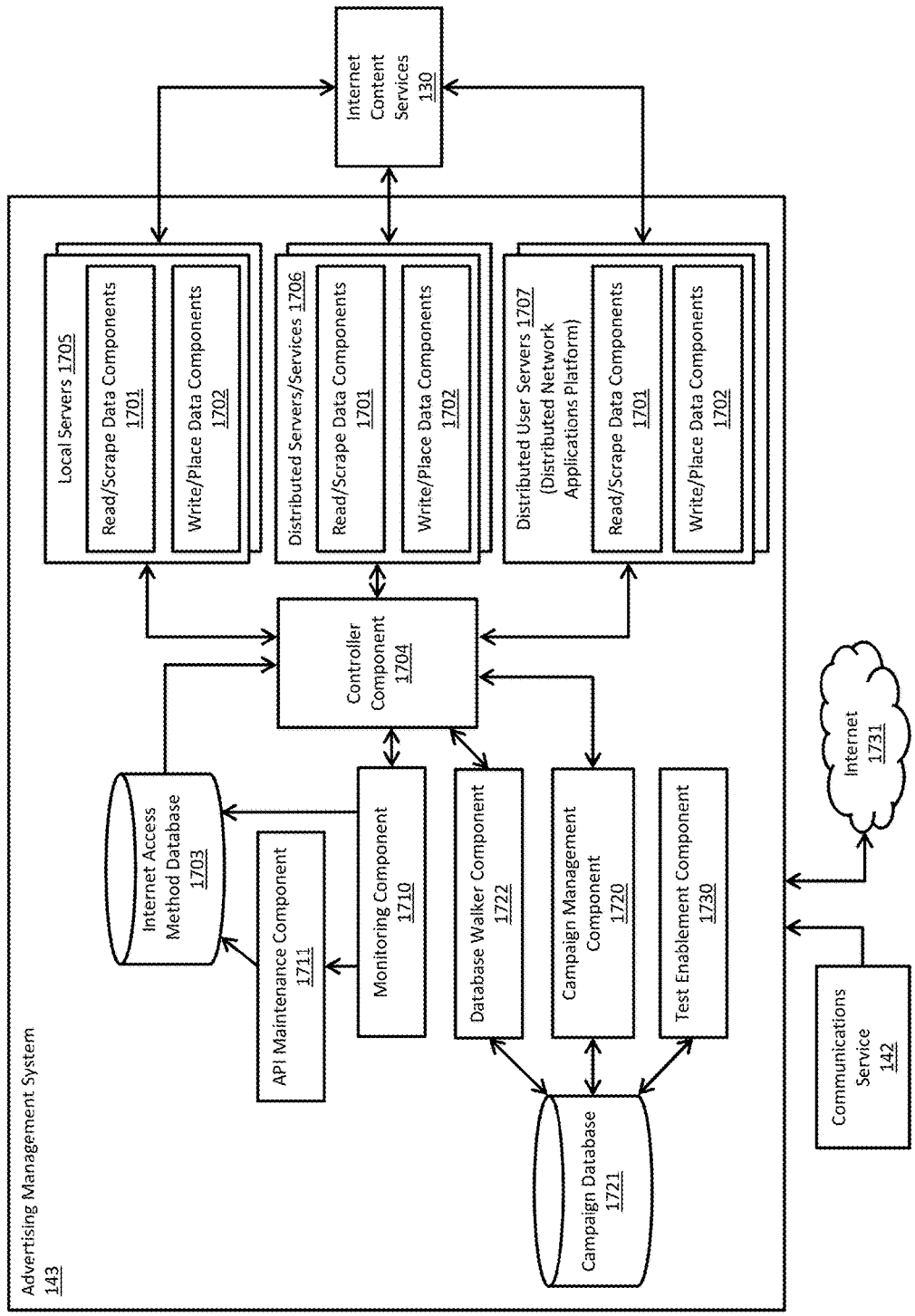
FIG. 10. illustrates a component diagram for the Advertising Management portion of an Optimized Advertising System.

FIG. 10 depicts an exploded component diagram 1700 of Advertising Management System 143 of FIG. 1.

Two components of the Advertising Management System 143 may be the two access components allowing data to be read or written to locations on the Internet: Read/Scrape Data Components 1701 and Write/Place Data Components 1702. These two components may interact with the various services composing Internet Content Services 130 and obtain information from them, either by directly using APIs, or scraping information as described above. To facilitate this, data about how information is accessed from and formatted for various Internet Content Services 130 components may be stored in Internet Access Method Database 1703. Read/Scrape Data Components 1701 and Write/Place Data Components 1702 may use information, for example API specifications, translations, transformations, scraping formulas, helper functions, access methods, source code, passwords, cryptographic keys, format definitions, and/or compiled accessor code and similar items stored by Internet Access Method Database 1703 to allow them to interact with the various components of Internet Content Services 130. Because Internet Access Method Database 1703 may be updated frequently, Read/Scrape Data Components 1701 and Write/Place Data Components 1702 may be always up to date with the most current mechanism to access data from each component service of Internet Content Services 130.

Read/Scrape Data Components 1701 and Write/Place Data Components 1702 may physically be located (i.e., the software may run on devices located) in a number of places While there may be other locations, FIG. 10 illustrates three places where Read/Scrape Data Components 1701 and Write/Place Data Components 1702 may reside. Local Servers 1705 illustrates servers operated as part of the Optimized Advertising System 140. These could include machines physically located on the premises of some location of the organization (e.g., servers, desktops, etc.) as well as fully-leased or hosted machines off site.

Distributed Servers/Services 1706 illustrates machines used on behalf of the Optimized Advertising System 140. These machines could be temporarily leased servers, such as those provided by cloud hosting services (e.g., Amazon EC2, Microsoft Azure, etc.), or distributed systems intended to obfuscate the source of traffic by making it appear to originate from many different locations by collectively routing information on one another's behalf (e.g., a TOR systems [TOR]).

Distributed User Systems 1707 illustrates a network of Internet hosts under at least some control by Advertising Broker 141, though potentially not owned or physically located on controlled property (e.g., devices associated with the Distributed Network Application Platform 149 described above in relation to FIG. 1). In some embodiments, these devices may be part of a Distributed Network Application Platform 149, as described in relation to FIG. 1. Read/Scrape Data Components 1701 and Write/Place Data Components 1702 could be run on these consumer devices, on behalf of the Optimized Advertising System 140. For example, when Advertising Broker 141 operates a telephony service, these devices would be the end user (e.g., Distributed Network Application Customers 150) telephony adapters or telephony-enabled modems. Similarly, when Optimized Advertising System 140 is operated by an Internet service company, for example a cable or DSL broadband Internet access provider, these devices could be cable modems, set top boxes, DSL modems, etc. In any case, by means of operating the service, the Advertising Broker 141 has access to these devices to enable reading, scraping, and placing of data.

To facilitate control of these distributed instances of the Read/Scrape Data Components 1701 and Write/Place Data Components 1702, a Controller Component 1704 may be connected to each instance of Read/Scrape Data Components 1701 and Write/Place Data Components 1702 and allow them to access Internet Access Method Database 1703, and be controlled by other components, as described below.

Monitoring Component 1710 may periodically monitor the many locations (e.g., websites) where information (e.g., advertisements) may be placed. For example, Monitoring Component 1710 may frequently attempt to look up information and/or to place "test" information at the various entities that make up Internet Content Services 130 by instructing (via Controller Component 1704) one or more of Read/Scrape Data Components 1701 and Write/Place Data Components 1702 to perform a read or write operation. In some embodiments, "test" information (e.g., advertisement) is provided to a website using a template and/or API. When Monitoring Component 1710 fails to read or write information (e.g., advertisement not included with a website when the website is accessed, advertisement cannot be written such that it is included when the website is accessed, and the like), the mechanism used to access that provider, as defined in Internet Access Method Database 1703 may be outdated or have changed. The website can be determined to have not correctly received the "test" information (e.g., advertisement) when the read and/or write fails. Since some of the Internet Content Services 130 providers, most notably Crowd-Sourced Services 132, are optimized for humans, rather than providing more machine-friendly interfaces, these may be the most likely to change. However, even providers with well-defined APIs and templates may change them periodically. If a change is noticed, the entry in Internet Access Method Database 1703 may be marked as stale, preventing Read/Scrape Data Components 1701 and Write/Place Data Components 1702 from attempting to use that mechanism. Additionally, Monitoring Component 1710 sends a message to API (and template) Maintenance Component 1711 in such cases, indicating this access method is invalid and requires updating.

API (and template) Maintenance Component 1711, upon receiving messages from Monitoring Component 1710 about a non-working access method, may execute a number of automatic routines to attempt to detect and correct what has changed for that particular service, updating Internet Access Method Database 1703. When API (and template) Maintenance Component 1711 is unable to automatically correct the change, a developer may be notified so they can manually correct the entry for a particular provider stored in Internet Access Method Database 1703. In this way, a non-working (e.g., outdated) template and/or API can be automatically changed, or a human operator can be directed to change the non-working (e.g., outdated) template and/or API. The location (e.g., website) can then correctly receive the "test" information (e.g., advertisement) using the changed template and/or API. In some embodiments, the changed template and/or API can be stored (e.g., Internet Access Method Database 1703 is updated).

Read/Scrape Data Components 1701 and Write/Place Data Components 1702 may recognize when a CAPTCHA (Completely Automated Public Turing test to tell Computes and Humans Apart) has been encountered, and to request human intervention from Advertising Broker 141 or a service they designate to provide such intervention. CAPTCHAs are tests designed to determine that an interaction is with a person, and not a computer, for example by asking the user to solve a simple puzzle or recognize some difficult to read textual information, often embedded in a photograph. Humans may also be alerted for other CAPTCHA-like puzzles, or in the more general case, where the computer is unable to determine how to proceed with extracting or entering data.

Campaign Management Component 1720 may control Read/Scrape Data Components 1701 and Write/Place Data Components 1702, again via Controller Component 1704, using them to place Associated Contact Identifiers 302 on the Internet with various appropriate Internet Content Services 130 when advertising campaigns begin or end. The Campaign Management Component 1720 may allow the Advertising Broker 141 to specify which services should be used, and for how long, and allow for various Internet Content Services 130 to be turned off as needed, for example, when daily advertising limits are reached. Information about which Internet Content Services 130 services are being used, appropriate keywords to store against, Associated Contact Identifiers 302, desired rankings, and competitor information for each campaign may be stored in Campaign Database 1721, which may store information relating to each advertiser/advertising campaign.

Database Walker Component 1722, like Monitoring Component 1710, may periodically poll the various Internet Content Services 130 using Read/Scrape Data Components 1701 and Write/Place Data Components 1702 via Controller Component 1704. In some embodiments, rather than verifying the mechanisms used to access Internet Content Services 130, it may query them to make sure changes that have been put in place by Campaign Management Component 1720, as stored in Campaign Database 1721, are still in place. While it is less likely that paid advertisements will not be in place, Crowd-Sourced Services 132 may be changed frequently, for example, as other edits are made to them. In various embodiments, a competitor may associate their Contact Identifier, rather than Associated Contact Identifier 302, with a particular map location or review site keyword. Database Walker Component 1722 may use Read/Scrape Data Components 1701 to check all data in Campaign Database 1721 periodically, and when data has been altered or removed, use Write/Place Data Components 1702 to update/correct that data with Internet Content Services 130. The Database Walker 1722 may also be used to verify and (as needed) improve rankings or to reduce rankings for competitors.

Test Enablement Component 1730 may be used when various Internet Content Services 130, particularly Crowd-Sourced Services 132, query Advertising Broker 141 to verify information. These services will occasionally manually verify information. For example, a phone number associated with a particular location in a map system or keyword on a review site may be called by that service, and information about the color of the building, name of the cross street, etc. may be requested, in an effort to verify the Associated Contact Identifier 302 is correctly associated with that location. Test Enablement Component 1730 may assist with this. By connecting to the Internet 1731, as well as Campaign Database 1721, and pulling up information about all locations associated with Associated Contact Identifiers 302, and quickly providing access to information such as street-level map photography, overview maps, and other information, the information needed to respond quickly to these queries may be made available. In some embodiments, the cooperation of Communications Service 142 may detect that calls to Associated Contact Identifiers 302 are from a known number belonging to Internet Content Services 130, rather than an End Customers 120. When these calls are received, they may be forwarded directly to employees of Advertising Broker 141 or their agents for handling, and information may be presented to these employees from Test Enablement Component 1730.

The distributed nature of Advertising Management System 143, enabled by reading and writing information from Local Servers 1705, Distributed Servers/Services 1706, and Distributed User Servers 1707 (Distributed Network Application Platform 149), combined with a unique randomization timing algorithm, may give the Optimized Advertising System 140 several unique capabilities.

The services of the Internet Content Services 130, particularly Crowd-Sourced Services 132, may have algorithms intended to prevent a single entity from "gaming" the system by placing spoofed reviews, creating too many crowd-sourced entries, etc. Such algorithms may interfere with the Optimized Advertising System 140's ability to populate a large number of locations on the Internet with Associated Contact Identifiers 302 in a rapid fashion. In some embodiments, the unique distributed design of the system may allow these algorithms to be circumvented.

To place advertisements or information on crowd-sourced sites related to Associated Contact Identifiers 302 on sites which preclude too many updates from a particular IP or family of closely related IPs, Campaign Management Component 1720 may ask Controller Component 1704 to distribute the requested updates across a number of different physical machines selected from among Local Servers 1705, Distributed Servers/Services 1706, and Distributed User Servers 1707. The use of the Distributed User Servers 1707 can be particularly useful, as these machines (e.g., VoIP endpoints or Cable Modems) are likely to have IP addresses associated with individual End Customer 120, making them very difficult to detect as originating from an advertising service. A specialized algorithm may be incorporated that randomizes the time that these requests are sent to Internet Content Services 130 providers, ensuring that a "burst" of updates is not seen/discovered, which could trigger other detection algorithms. In some embodiments, such updates are designed to ensure that the time an update is sent from a device is sent during normal waking hours for that device's location (e.g., correct time-of-day), that the updates are sent at a slow enough rate to be executed by a human, and even that the rate that multiple requests are sent by a particular device exhibit patterns consistent with human behavior.

Further, this distributed network of hosts can be used to reinforce advertising placed by Optimized Advertising System 140. Some services may allow end users to mark good or bad advertisement or location information, for example, by clicking on star ratings, indicating positive reviews with an up arrow or like button, and other similar mechanisms. In some cases, pure numbers visiting a link—again from unique IP addresses—may be used to rank which site (and hence Associated Contact Identifiers 302) are presented when End Customer 120 searches for certain values. Similarly, competitors' entries may be down voted using this mechanism.

Campaign Management Component 1720 may periodically, or Database Walker Component 1722 in the performance of the verification routines can also mark advertisements, reviews, or location information for Associated Contact Identifiers 302 as positive, and competitor's entries as negative. This is accomplished via Controller Component 1704, which may instruct Local Servers 1705, Distributed Servers/Services 1706 and/or Distributed User Servers 1707 to provide positive feedback, using Read/Scrape Data Components 1701 and Write/Place Data Components 1702 using information in Internet Access Method Database 1703 to correctly format information. Again, timing, time-of-day, and rate at which these positive reviews are placed may be carefully controlled.

Campaign Management Component 1720, or Database Walker Component 1722 may also periodically make very specific requests or searches for certain keywords used by competitive campaigns. Campaign Database 1721 may include keywords carefully chosen to trigger competitor advertisements to be displayed, but not by Advertising Broker 141. Advertising services may be configured to only display a certain number of advertisements per day, to limit total costs. By using the distributed system described above, in concert with keywords chosen to trigger only competing advertisements to place searches from the many hosts, the competing campaign's advertising budget can be quickly exhausted by advertisements that End Customers 120 do not actually see, increasing the relative visibility of Advertising Broker 141's advertisements and entries in crowd-sourced services.

Advertising Broker 141 can also use the Distributed Network Application Platform 149 to provide services to Distributed Network Application Customers 150. In one embodiment, services are offered to allow an increased level of privacy when accessing information on the Internet, or when communicating, by having Distributed Network Application Customer 150 data distributed across many other customers' devices, providing a higher level of anonymity. As shown in FIG. 10, this is performed as a distributed operation of the other Read/Scrape Data Components 1701 and Write/Place Data Components 1702 on Distributed User Servers 1707.

Figure 11:
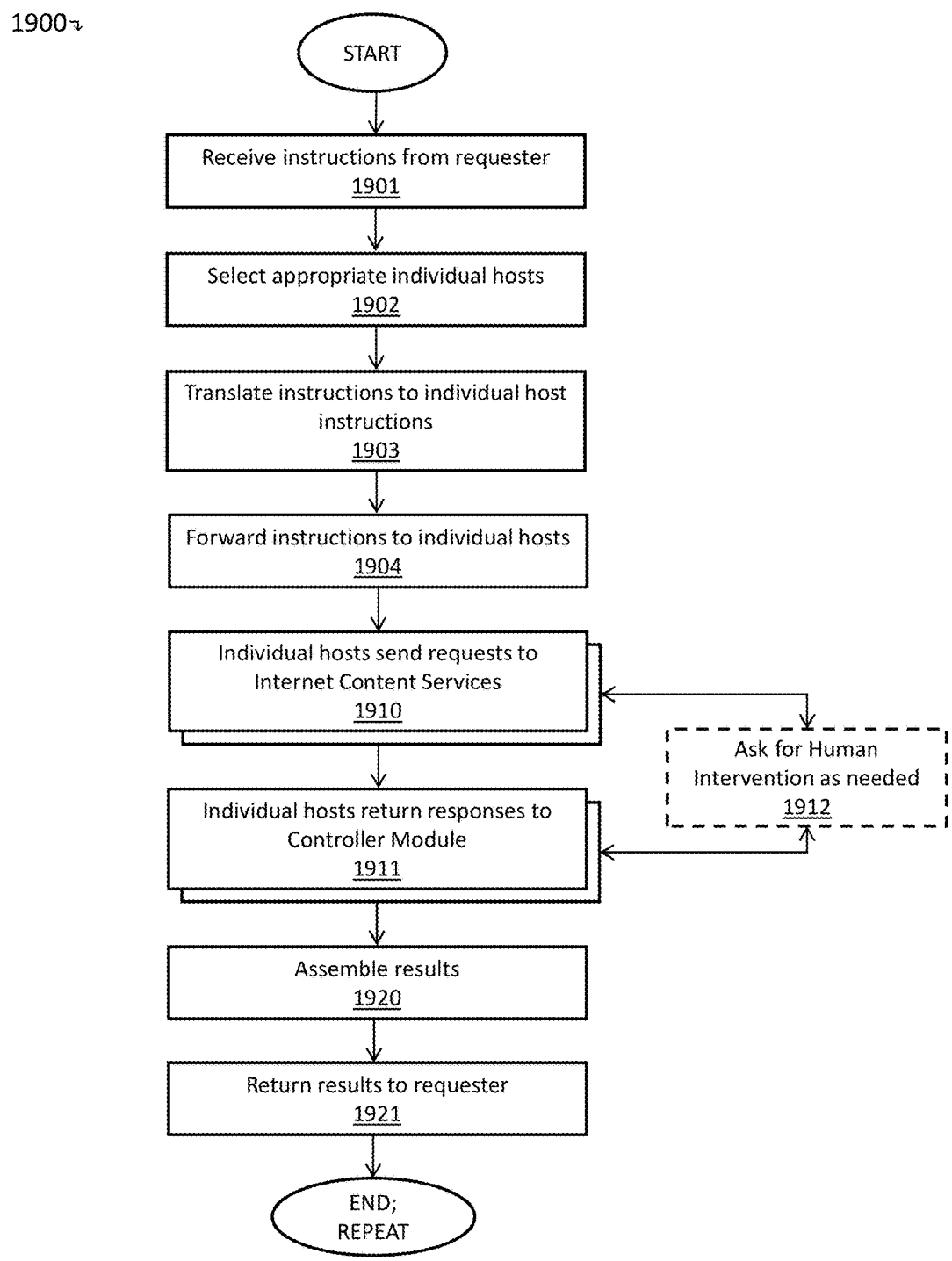
FIG. 11. illustrates a process diagram for performing distributed actions among many devices, as performed by an Optimized Advertising System.

FIG. 11 illustrates a flow diagram for process 1900 for (e.g., the Controller Component 1704) receiving instructions to perform a distributed communication with Internet Content Services 130 using one or more of Local Servers 1705, Distributed Servers/Services 1706, and Distributed User Servers 1707. The Controller Component 1704 may then process the results and return a response. In some embodiments, multiple instances of process 1900 may be in progress at any one time, as many requests may be outstanding (e.g., particularly those designed to run over time to appear "human"), all managed by Controller Component 1704.

At step 1901, Controller Component 1704 may receive a formatted request to perform an operation from a requester, one of the other Components of the Advertising Management System 143 (e.g., Monitoring Component 1710, Campaign Management Component 1720, Database Walker Component 1722, etc.). This request may include at least one of: the desired operation (e.g., reading information, modifying information, etc.), the target Internet Content Services 130, and appropriate instructions about requested geographic regions, time-of-day, rates, and timing that the Controller Component 1704 should apply when selecting hosts to send the information.

At step 1902, Controller Component 1704 may select appropriate individual hosts to participate in the request (e.g., from one or more of Local Servers 1705, Distributed Servers/Services 1706, and Distributed User Servers 1707). At step 1903, the Controller Component 1704 may translate these instructions into a number of detailed instructions for each individual host, and at step 1904 may send the instructions to the selected hosts.

At step 1910, the individual hosts may each send their requests to the Internet Content Services 130, as requested by the Controller Component 1704. In some embodiments, timing and delays are handled by including this information in the individual instructions sent to the hosts, or by delaying sending the instructions to the individual hosts until action is requested. At step 1911, the individual hosts receive their responses, and send them back to Controller Component 1704. Some time may pass as steps 1910 and 1911 are completed, particularly if delayed timing has been requested in the instructions received at step 1901.

At optional step 1912, the individual hosts performing steps 1910 and 1911 may request human interaction, for example to solve CAPTCHAs (as described earlier) or to handle other unforeseen circumstances. When this occurs, humans engaged by Advertising Broker 141 (e.g., directly or hired as agents to perform this task) to assist as needed.

At step 1920, the results of the operation by each host (data requested, responses to data being set, etc.) may be collated (e.g., by Controller Component 1704), and assembled to be returned to the requester. At step 1921, the formatted response with all appropriate information may be returned to the requester.

While FIG. 11 depicts process 1900 being sequential for illustrative purposes only, data may be returned as it is collected if rapid, partial results are desirable. For example, steps 1920 and 1921 may be performed in parallel/concurrently with step 1911.

Figure 12:
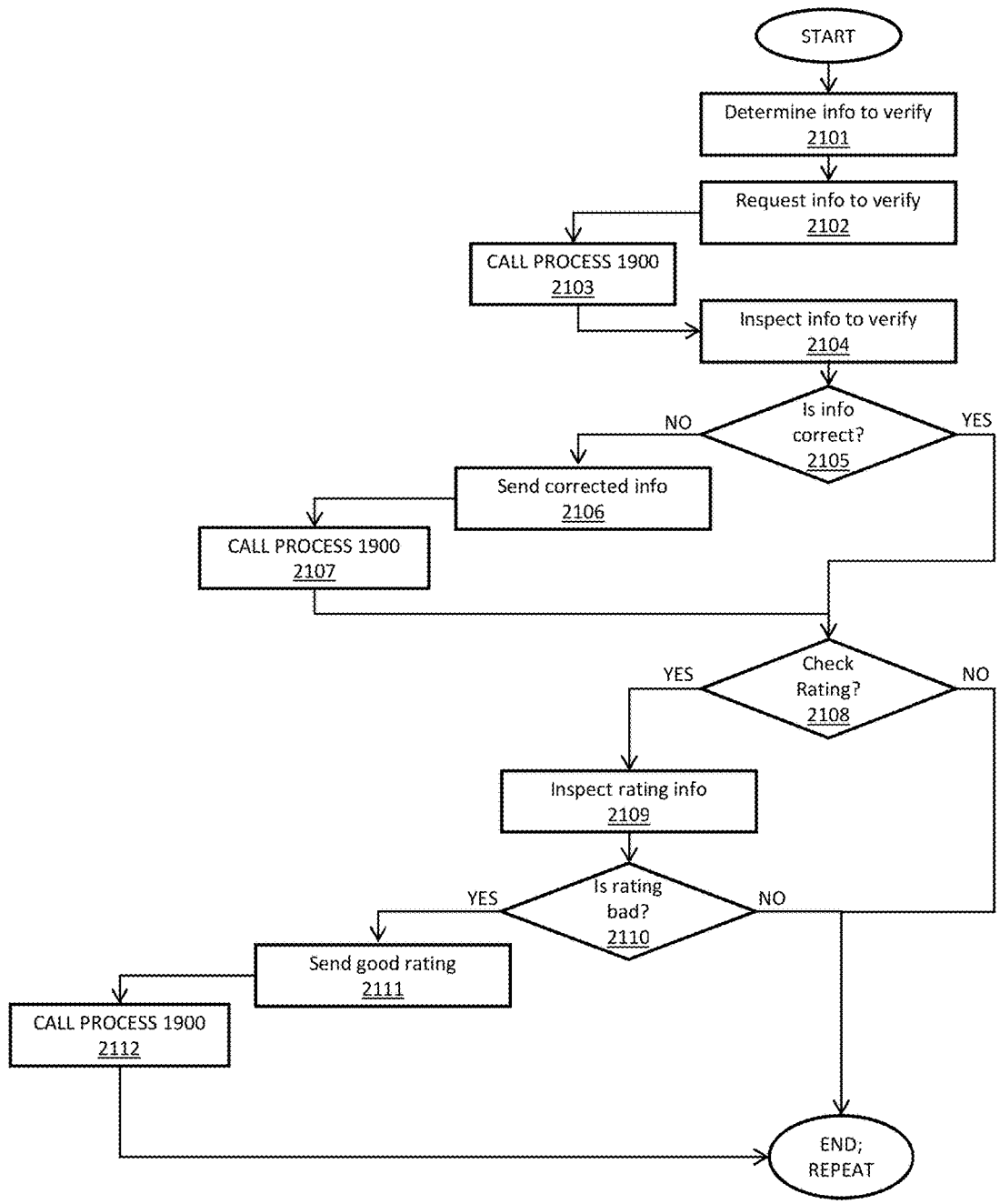
FIG. 12. illustrates a process diagram for performing maintenance of previously placed online advertisements and adjusting as needed, as performed by an Optimized Advertising System.

FIG. 12 illustrates process 2100 (e.g., used by Database Walker Component 1722) for checking for correct information (e.g., tied to Associated Contact Identifiers 302) or for improving ratings and/or rankings.

At step 2101, what information will be checked may be determined. At step 2102, a request to obtain the information from Internet Advertisers 130 to be verified may be assembled for the Controller Component 1704. This request may include appropriate instructions about requested geographic regions, time-of-day, rates, and timing that the Controller Component should apply when selecting hosts to send the information. At step 2103 the request may be passed to the Controller Component 1704, which executes the distributed request by performing process 1900 as illustrated in FIG. 11. At step 2104 the information is inspected to see if it is still correct, for example if the correct name and Associated Contact Identifiers 302 are returned from the query.

At step 2105, when the information is correct, process 2100 may continue to step 2108. When the information is not correct, a new instruction message for the Controller Component 1704 may be prepared at step 2106, asking to have the information updated by remote hosts. In some embodiments, information about geographic distribution of hosts, time-of-day to send requests, and rate limiting are provided. At step 2107 the request is passed to the Controller Component 1704, which executes the distributed request by performing process 1900 as illustrated in FIG. 11.

At step 2108 whether ranking/rating information should also be checked for this information may be determined. If not, the process is completed, and the Database Walker Component 1722 moves to the next item to verify (e.g., process 2100 repeats/starts again). If checking of ranking/rating information is requested, process 2100 continues at step 2109.

At step 2109, the information obtained at step 2103 may be reexamined to inspect any rating or ranking information. At step 2110 whether the rating or ranking is below desired levels may be determined. If not, the process is completed, and the Database Walker Component 1722 moves to the next item to verify (e.g., process 2100 repeats/starts again).

When the rating or ranking is determined to be below a desired level at step 2110, a new instruction message for the Controller Component 1704 may be prepared at step 2111. This instruction asks to have the information updated by remote hosts, in this case placing a more favorable rating or review, "liking" performing an "up vote", or some similar action. In some embodiments, improving a ranking may simply include setting up many hosts to visit the link, implying traffic. In various embodiments, information about geographic distribution of hosts, time-of-day to send requests, and rate limiting are provided. At step 2112 the request may be passed to the Controller Component 1704—which executes the distributed request by performing process 1900 as illustrated in FIG. 11—and the Database Walker Component 1722 moves to the next item to verify (e.g., process 2100 repeats/starts again).

In some embodiments, the Database Walker Component 1722 may be tasked with reducing the rankings or competing entries or executing searches that are designed to trigger (and thus waste) competitor's advertisements. These steps are not shown in FIG. 12.

Similar to the process 2100 shown in FIG. 12, the Monitoring Component 1710, Campaign Management Component 1720, and Customer Database Walker Component 148 may also use the process 1900 (FIG. 11) to perform distributed operations, by sending requests to Controller Component 1704 asking it to use the hosts composed of Local Servers 1705, Distributed Servers/Services 1706, and Distributed User Servers 1707 to perform required operations, obfuscating the actual source of the requests.

(Periodically) Customer Database Walker Component 148 may walk End Customer Database 145 to identify entries related to End Customers 120 of Advertiser 110 and perform certain actions. In some embodiments, Customer Database Walker Component 148 identifies a set of End Customer 120 who have not called or otherwise been in contact for an extended period, in order to attempt to re-engage those customers. Options include at least one of: sending them an email message or alert on a mobile app via Advertising Management System 143; sending a text message or placing a phone call via Communications Service 142; reaching out over social media via Social Media Services 134; or in other ways. In some embodiments, the options can be combined with a special offer, for example, as described in step 911 and 1110, presented through the outreach, or configured to be available when the customer calls.

In some embodiments, the Customer Database Walker Component 148 may identify geographical regions, demographic segments (age, gender), economic segments, etc. that are disproportionately represented (e.g., either under or over represented). These may be targeted for direct outreach, as described above, or Advertising Management System 143 can be used to adjust the distribution of advertisements on Internet Content Services 130, in an effort to adjust these patterns.

The identified geographical regions, demographic segments, economic segments, etc. can also be provided to the Advertisers 110 as a message or report. The message or report can be delivered through the Advertiser Interface 146 as a display in software, message passed via API, message displayed in an application, alert in an application, as an email, and other mechanisms. The message or report may also be delivered via Communications Service 142 (e.g., as a text message or call to Advertisers 110).

(Periodically) Customer Database Walker Component 148 may walk the End Customer Database 145 and identify End Customers for which additional information is desired. Advertising Management System 143 may then be contacted (e.g., via OAS Controller Component 147), and used to access the Internet, using the Local Servers 1705, Distributed Servers 1706, and/or Distributed User Servers 1707 described above. Searches about the End Customer 120 may be performed, and the information obtained is used to augment End Customer Database 145.

In some embodiments, outside interests could contact Advertising Broker 141, and use the data stored in the Optimized Advertising System 140 to identify information of relevance or reach selected groups of End Customers. For example, a government agency could identify geographical areas that either require additional resources or are targets for programs to improve the business or customer participation in that region. Similar data can be obtained based on other demographic information. This information may accurately reflect, in real time, economic trends of use to government or other entities in determining how resources are deployed. The Customer Walker Database Component could also be used to identify End Customers 120 in a particular area, for targeted emergency broadcasts, public service announcements, updates, and the like. Additionally, Communications Service 142 can be used to help facilitate reaching these End Customers 120.

Optimized Advertising System 140 may provide a large number of mechanisms for Advertisers 110 to reach End Customers 120, including through various Internet Content Services 130, through IVR services included in Communications Service 142, through special offers displayed on dashboards to call operators, through special offers played before connecting to operators or on the IVR using Communications Service 142, and through other means. The Optimized Advertising System 140 may provide a unified tool for managing these mechanisms and keeping them synchronized, for example when making a new offer. This control mechanism may be provided to Advertisers 110 or their agents through Advertiser Interface 146.

Figure 13:
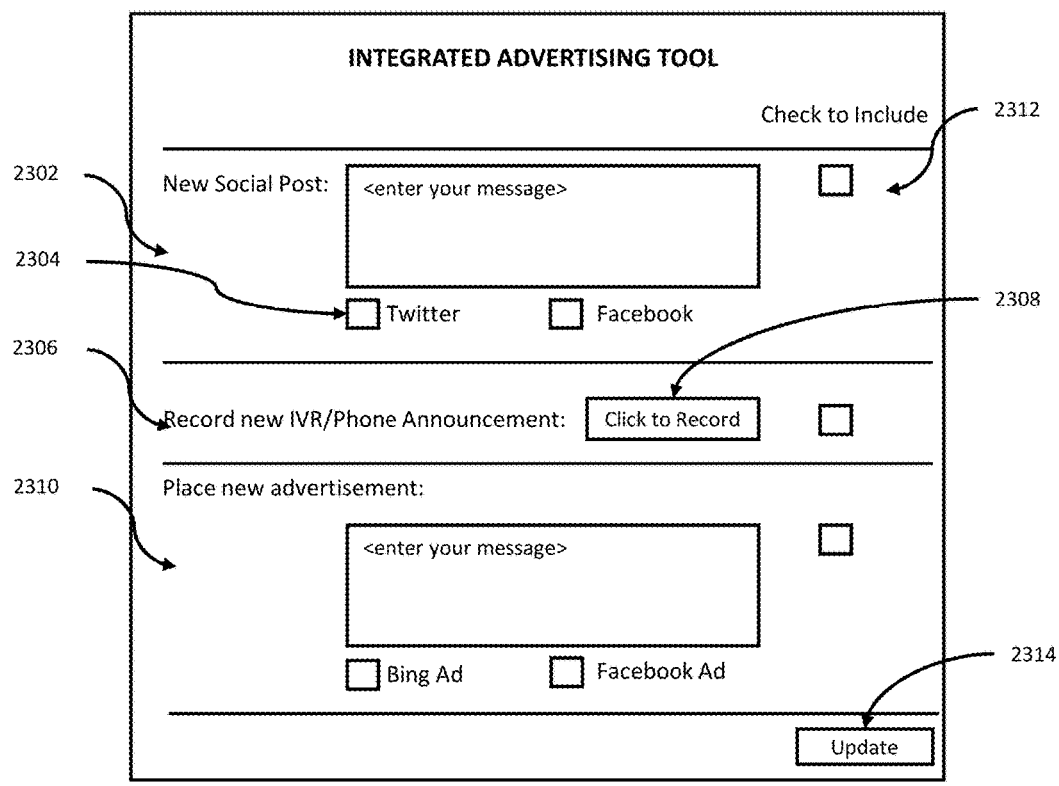
FIG. 13. illustrates a sample interface for an integrated advertising control panel in an exemplary implementation of an Optimized Advertising System.

FIG. 13 illustrates a simplified example of an interface for Advertiser 110 to update all components of Optimized Advertising System 140, presented as a webpage 2300, according to some embodiments. Although webpage 2300 is simplified for illustrative purposes, multiple other forms of visual presentation (e.g., as described above in relation to FIG. 8) may be used.

While many services may be made available by Optimized Advertising System 140, three are shown by way of non-limiting example: a social media posting 2302, new IVR message 2306, and advertisement 2310. While two choices are offered by way of further non-limiting example of where to place social media postings 2302 and Internet advertisements, other choices may be used.

Three options may presented in simplified interface (e.g., of webpage 2300). Social media posting 2302 shows the Advertiser 110 or their agents an option to type a new social media message, and select which Social Media Services 134 they would like the new message to be displayed on using checkboxes 2304.

To ensure this new information is synchronized with new IVR message 2306, the interface may present a section addressing new IVR messages, for example, recorded by pressing button 2308. In some embodiments, recording a message may launch an interface with further choices, such as where the message should be played, allowing restrictions on to whom the message is played (e.g., demographics, geography, etc.), where in the call flow it should be played, etc. (not shown in FIG. 13).

Advertisement 2310 allows the Advertiser 110 to enter a new advertisement to be placed with Internet Advertising Services 131, Internet Sites 133, or on Search Providers 136, and includes checkboxes to select which services to use.

As shown on the right side of the interface (e.g., of webpage 2300), checkboxes 2312 are presented for each possible mechanism, allowing Advertisers 110 to select only those they wish to use for this new information/advertisement/offer. After selecting all appropriate information and filling in the choices, the Advertiser 110 may update the Optimized Advertising System 140 by pressing the Update button 2314.

Using webpage 2300, Advertisers 110 may easily ensure that a new announcement—for example a new special offer—is presented consistently to End Customers 120 across all mechanisms available through Optimized Advertising System 140. In some embodiments, allowing them to configure them all in one location may remind them of all available options, potentially even those that are not currently being used or paid for.

As another revenue generating service, Advertising Broker 141 may also be able to charge End Customers 120 to have their data withheld from the End Customer Database 145. This may be a directly charged service, or in the case of customers who also use other services provided by Advertising Broker 141 (e.g., Distributed Network Application Customers 150), it could be in the form of a "premium" version the service that does not collect data on the customers. Alternately, discounts on services could be offered to these customers willing to share additional information.

Figure 14:
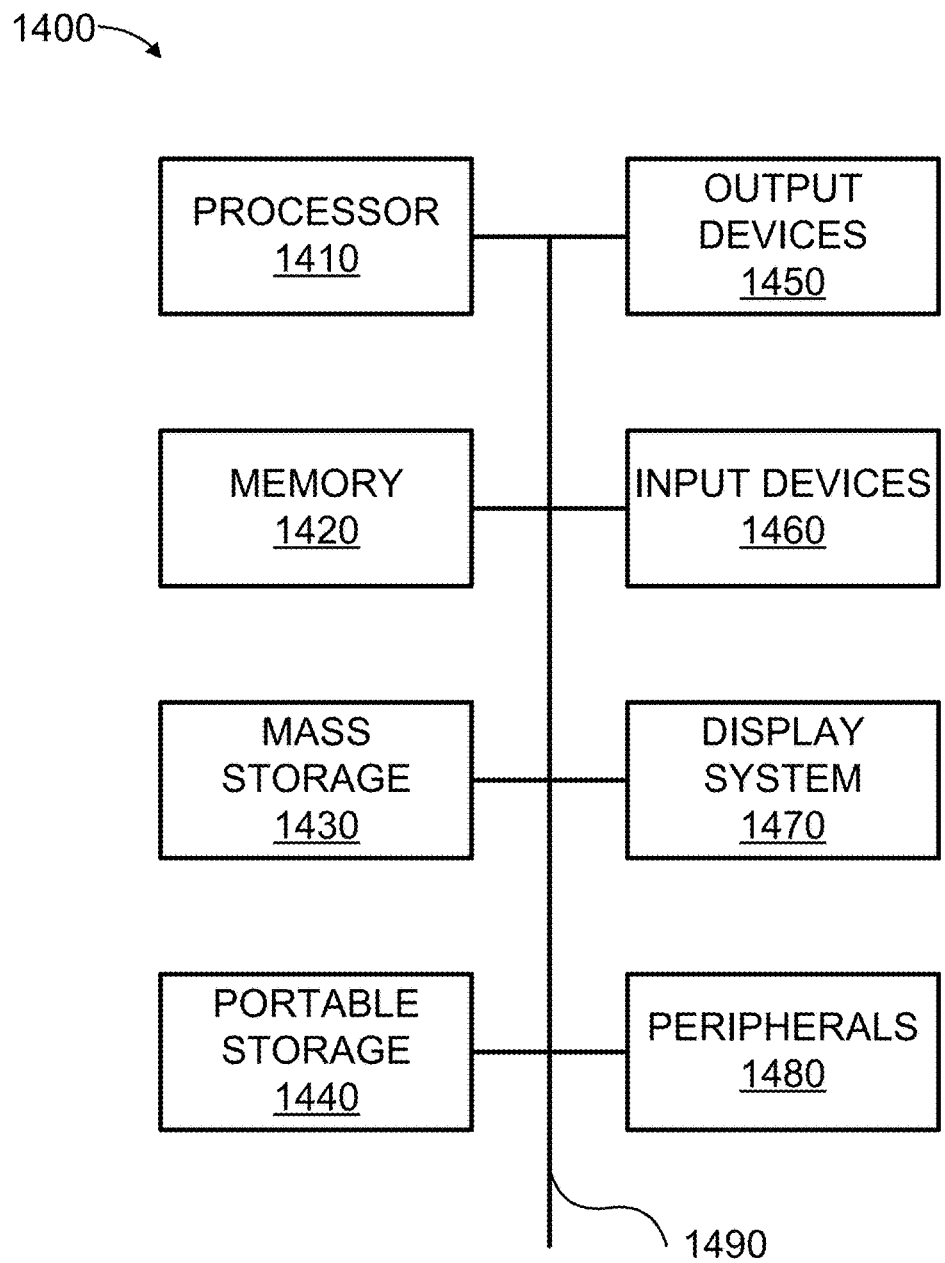
FIG. 14 is a simplified block diagram of a computing system, according to various embodiments.

FIG. 14 illustrates an exemplary computer system 1400 that may be used to implement some embodiments of the present invention. The computer system 1400 in FIG. 14 may be implemented in the contexts of the likes of computing systems, networks, servers, or combinations thereof. The computer system 1400 in FIG. 14 includes one or more processor unit(s) 1410 and main memory 1420. Main memory 1420 stores, in part, instructions and data for execution by processor unit(s) 1410. Main memory 1420 stores the executable code when in operation, in this example. The computer system 1400 in FIG. 14 further includes a mass data storage 1430, portable storage device 1440, output devices 1450, user input devices 1460, a graphics display system 1470, and peripheral device(s) 1480.

The components shown in FIG. 14 are depicted as being connected via a single bus 1490. The components may be connected through one or more data transport means. Processor unit(s) 1410 and main memory 1420 are connected via a local microprocessor bus, and the mass data storage 1430, peripheral device(s) 1480, portable storage device 1440, and graphics display system 1470 are connected via one or more input/output (I/O) buses.

Mass data storage 1430, which can be implemented with a magnetic disk drive, solid state drive, or an optical disk drive, is a non-volatile storage device for storing data and instructions for use by processor unit(s) 1410. Mass data storage 1430 stores the system software for implementing embodiments of the present disclosure for purposes of loading that software into main memory 1420.

Portable storage device 1440 operates in conjunction with a portable non-volatile storage medium, such as a flash drive, floppy disk, compact disk, digital video disc, or Universal Serial Bus (USB) storage device, to input and output data and code to and from the computer system 1400 in FIG. 14. The system software for implementing embodiments of the present disclosure is stored on such a portable medium and input to the computer system 1400 via the portable storage device 1440.

User input devices 1460 can provide a portion of a user interface. User input devices 1460 may include one or more microphones, an alphanumeric keypad, such as a keyboard, for inputting alphanumeric and other information, or a pointing device, such as a mouse, a trackball, stylus, or cursor direction keys. User input devices 1460 can also include a touchscreen. Additionally, the computer system 1400 as shown in FIG. 14 includes output devices 1450. Suitable output devices 1450 include speakers, printers, network interfaces, and monitors.

Graphics display system 1470 include a liquid crystal display (LCD) or other suitable display device. Graphics display system 1470 is configurable to receive textual and graphical information and processes the information for output to the display device.

Peripheral device(s) 1480 may include any type of computer support device to add additional functionality to the computer system.

The components provided in the computer system 1400 in FIG. 14 are those typically found in computer systems that may be suitable for use with embodiments of the present disclosure and are intended to represent a broad category of such computer components that are well known in the art. Thus, the computer system 1400 in FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1400 may be implemented as a cloud-based computing environment, such as a virtual machine operating within a computing cloud. In other embodiments, the computing system 1400 may itself include a cloud-based computing environment, where the functionalities of the computing system 1400 are executed in a distributed fashion. Thus, the computing system 1400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1400, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for Internet advertising comprising:
   providing an advertisement of a plurality of advertisements including a first identifier to a website of a plurality of websites using at least one of a template and an application programming interface (API) associated with the website, the advertisement to be displayed on the website;
   receiving a communications session initiated by an end customer using the first identifier, the communications session including a second identifier associated with the end customer;
   accepting the communications session when the second identifier is not included in a black list, the black list being produced using at least reported spam;
   retrieving a record associated with the end customer using the second identifier;
   determining to provide a customized message to the end customer using the record;
   selecting a promotional offer using the record;
   providing the customized message to the end customer using the communications session, the customized message including the promotional offer and a request for an indication of interest in the promotional offer;
   directing the communications session to a live agent of a plurality of live agents in response to receiving the indication of interest from the end customer;
   storing data associated with the communications session;
   removing the advertisement from the website; and
   re-assigning the first identifier to another advertisement of the plurality of advertisements when a number of calls received at the first identifier since the removing the advertisement is below a predetermined threshold.

2. The computer-implemented method of claim 1 further comprising:
   providing a second advertisement to the website using at least one of the template and the API;
   determining the website does not correctly receive the second advertisement;
   changing at least one of the template and the API or directing a human operator to change the at least one of the template and the API, such that the website correctly receives the second advertisement using at least one of the changed template and the changed API; and
   storing at least one of the changed template and the changed API.

3. The computer-implemented method of claim 1 further comprising:
   determining at least one of a predetermined amount of time has elapsed since the advertisement was provided, a first number of calls received at the first identifier is below a first predetermined threshold, and a second number of calls received at the first identifier during the predetermined amount of time is below a second predetermined threshold; and
   removing the advertisement from the website of the plurality of websites using at least one of the template and the API.

4. The computer-implemented method of claim 1 further comprising:
   recording the communications session;
   storing the recorded communications session; and
   offering the recorded communications session for sale.

5. The computer-implemented method of claim 1 wherein the advertisement is at least one of a: banner advertisement, social media posting, review on a crowd-sourced review site, blog post, daily deals, and coupon.

6. The computer-implemented method of claim 1 wherein:
   the communications session is at least one of a: telephone call, videotelephony call, instant messaging session, webpage communications, and communications from a mobile application, and
   the first identifier is at least one of a: telephone number, handle or user identifier for a communications service, and URL for webpage communications.

7. The computer-implemented method of claim 1 wherein the record includes at least one of: location information, demographic information, socioeconomic information, past promotional offers accepted information, keywords extracted from earlier communications sessions, and other web sites visited.

8. The computer-implemented method of claim 1 wherein the promotional offer is selected using at least one of: location information, demographic information, socioeconomic information, past promotional offers accepted information, keywords extracted from earlier communications sessions, prior communications with at least one third party, other web sites visited, a product or service purchased by consumers within a pre-defined radius from the end customer, and news or weather within the pre-defined radius.

9. The computer-implemented method of claim 1 wherein the live agent is selected from the plurality of live agents using load balancing, the load balancing using at least one of: temporal availability to receive the communications session, shortest wait time, the record, a live auction, committed amount to pay for receiving the communications session, and contract terms.

10. The computer-implemented method of claim 1 wherein the promotional offer is by a different entity than the advertisement.

11. The computer-implemented method of claim 1 further comprising:
    displaying to the live agent at least some information from the record associated with the end customer.

12. A system for Internet advertising comprising:
    a processor; and
    a memory, the memory coupled to the processor and storing instructions executable by the processor to perform a method comprising:
        providing an advertisement of a plurality of advertisements including a first identifier to a website of a plurality of websites using at least one of a template and an application programming interface (API) associated with the website, the advertisement to be displayed on the website;
        receiving a communications session initiated by an end customer using the first identifier, the communications session including a second identifier associated with the end customer;
        accepting the communications session when the second identifier is not included in a black list, the black list being produced using at least reported spam;
        retrieving a record associated with the end customer using the second identifier;
        determining to provide a customized message to the end customer using the record;
        selecting a promotional offer using the record;
        providing the customized message to the end customer using the communications session, the customized message including the promotional offer and a request for an indication of interest in the promotional offer;
        directing the communications session to a live agent of a plurality of live agents in response to receiving the indication of interest from the end customer;
        storing data associated with the communications session;
        removing the advertisement from the website; and
        re-assigning the first identifier to another advertisement of the plurality of advertisements when a number of calls received at the first identifier since the removing the advertisement is below a predetermined threshold.

13. The system of claim 12, wherein the method further comprises:
    providing a second advertisement to the website using at least one of the template and the API;
    determining the website does not correctly receive the second advertisement;
    changing at least one of the template and the API or directing a human operator to change the at least one of the template and the API, such that the website correctly receives the second advertisement using at least one of the changed template and the changed API; and
    storing at least one of the changed template and the changed API.

14. The system of claim 12, wherein the method further comprises:
    determining at least one of a predetermined amount of time has elapsed since the advertisement was provided, a first number of calls received at the first identifier is below a first predetermined threshold, and a second number of calls received at the first identifier during a predetermined amount of time is below a second predetermined threshold; and removing the advertisement from the website of the plurality of websites using at least one of the template and the API.

15. The system of claim 12 further comprising:
recording the communications session;
storing the recorded communications session; and
offering the recorded communications session for sale.

16. The system of claim 12 wherein the advertisement is at least one of a: banner advertisement, social media posting, review on a crowd-sourced review site, blog post, daily deals, and coupon.

17. The system of claim 12 wherein:
the communications session is at least one of a: telephone call, videotelephony call, instant messaging session, webpage communications, and communications from a mobile application, and
the first identifier is at least one of a: telephone number, a handle or user identifier for a communications service, and URL for webpage communications.

18. The system of claim 12 wherein the record includes at least one of: location information, demographic information, socioeconomic information, past promotional offers accepted information, keywords extracted from earlier communications sessions, and other web sites visited.

19. The system of claim 12 wherein the promotional offer is selected using at least one of: location information, demographic information, socioeconomic information, past promotional offers accepted information, keywords extracted from earlier communications sessions, prior communications with at least one third party, other web sites visited, a product or service purchased by consumers within a pre-defined radius from the end customer, and news or weather within the pre-defined radius.

20. The system of claim 12 wherein the live agent is selected from the plurality of live agents using load balancing, the load balancing using at least one of: temporal availability to receive the communications session, shortest wait time, the record, a live auction, committed amount to pay for receiving the communications session, and contract terms.

21. The system of claim 12, wherein the method further comprises:
displaying to the live agent at least some information from the record associated with the end customer.

22. A non-transitory computer-readable storage medium having a program embodied thereon, the program being executable by a processor to perform a method for Internet advertising, the method comprising:
providing an advertisement of a plurality of advertisements including a first identifier to a website of a plurality of websites using at least one of a template and an application programming interface (API) associated with the website, the advertisement to be displayed on the website;
receiving a communications session initiated by an end customer using the first identifier, the communications session including a second identifier associated with the end customer;
accepting the communications session when the second identifier is not included in a black list, the black list being produced using at least reported spam;
retrieving a record associated with the end customer using the second identifier;
determining to provide a customized message to the end customer using the record;
selecting a promotional offer using the record;
providing the customized message to the end customer using the communications session, the customized message including the promotional offer and a request for an indication of interest in the promotional offer;
directing the communications session to a live agent of a plurality of live agents in response to receiving the indication of interest from the end customer;
storing data associated with a communications session;
removing the advertisement from the website; and
re-assigning the first identifier to another advertisement of the plurality of advertisements when a number of calls received at the first identifier since the removing the advertisement is below a predetermined threshold.

* * * * *

UNITED STATES PATENT AND TRADEMARK OFFICE
CERTIFICATE OF CORRECTION

PATENT NO. : 10,116,796 B2  
APPLICATION NO. : 14/879329  
DATED : October 30, 2018  
INVENTOR(S) : James Im et al.

Page 1 of 1

It is certified that error appears in the above-identified patent and that said Letters Patent is hereby corrected as shown below:

In the Claims

Column 45 Line 7, that portion reading:
"further comprising"

Should read:
"wherein the method further comprises".

Signed and Sealed this
Second Day of August, 2022

Katherine Kelly Vidal
*Director of the United States Patent and Trademark Office*